US010730620B1

(12) United States Patent
Hanlon

(10) Patent No.: US 10,730,620 B1
(45) Date of Patent: Aug. 4, 2020

(54) UNMANNED AERIAL VEHICLE SCALE ALIGNMENT

(71) Applicant: Amazon Technologies, Inc., Seattle, WA (US)

(72) Inventor: Jon T. Hanlon, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 16/022,240

(22) Filed: Jun. 28, 2018

Related U.S. Application Data

(62) Division of application No. 14/734,940, filed on Jun. 9, 2015, now Pat. No. 10,035,592.

(51) Int. Cl.
*B64C 39/02* (2006.01)
*G01M 1/12* (2006.01)

(52) U.S. Cl.
CPC ........ *B64C 39/024* (2013.01); *B64C 2201/14* (2013.01); *G01M 1/125* (2013.01)

(58) Field of Classification Search
CPC .......................... B64C 39/024; B64C 2201/14
See application file for complete search history.

(56) References Cited

U.S. PATENT DOCUMENTS

| | | | | |
|---|---|---|---|---|
| 4,363,369 A * | 12/1982 | Susor | ................... | G01G 3/1402 177/145 |
| 5,081,865 A * | 1/1992 | Schechter | ............. | G01M 1/122 73/483 |
| 5,750,937 A * | 5/1998 | Johnson | ............. | G01G 23/3707 177/199 |
| 8,505,373 B2 * | 8/2013 | Goertz | .................... | G01M 1/10 73/116.01 |
| 8,655,488 B2 * | 2/2014 | Iida | ........................ | B25J 9/1638 156/750 |
| 8,701,472 B2 * | 4/2014 | Wurst | ..................... | B66C 13/08 177/147 |
| 2006/0010965 A1 * | 1/2006 | Mastinu | .................. | G01M 1/10 73/65.07 |

(Continued)

OTHER PUBLICATIONS

Office Action for U.S. Appl. No. 14/734,997, dated Jun. 19, 2017, Hanlon, "Application Program Interface for Weight and Balance Metrics",13 pages.

(Continued)

*Primary Examiner* — Nathaniel T Woodward
(74) *Attorney, Agent, or Firm* — Lee & Hayes, P.C.

(57) ABSTRACT

A weight distribution associated with an unmanned aerial vehicle (UAV) may be determined prior to dispatch of the UAV and/or after the UAV returns from operation (e.g., a flight). In some embodiments, one or more UAVs may be placed on or proximate to a physical metrics acquisition (PMA) device. The PMA device may include a configurable scale and may be used to determine a distribution of weight of the UAV at three or more points associated with the UAV. The distribution of weight may be used generate analytics, which may include a total weight of a vehicle, a center of mass of the vehicle (in two or more dimensions), power requirements of the UAV for a given flight task (e.g., how much battery power the UAV requires, etc.), and/or other analytics. In various embodiments, the PMA device may perform moment of inertia tests for the UAV.

20 Claims, 16 Drawing Sheets

(56) References Cited

U.S. PATENT DOCUMENTS

| | | |
|---|---|---|
| 2006/0283239 A1 | 12/2006 | Leroy et al. |
| 2008/0119967 A1 | 5/2008 | Long et al. |
| 2010/0121560 A1 | 5/2010 | Vetsch |
| 2011/0219893 A1 | 9/2011 | Fiala et al. |
| 2011/0224866 A1 | 9/2011 | Chen |
| 2011/0307189 A1* | 12/2011 | Petruska ............... G01L 5/16 |
| | | 702/41 |
| 2013/0092456 A1 | 4/2013 | Laird et al. |
| 2013/0192903 A1 | 8/2013 | Dubois |
| 2013/0327579 A1 | 12/2013 | Nance |
| 2014/0129059 A1* | 5/2014 | Scarlatti ............ B64C 39/024 |
| | | 701/16 |
| 2015/0316438 A1 | 11/2015 | Nance |
| 2015/0336668 A1* | 11/2015 | Pasko ................. B64C 39/024 |
| | | 701/2 |
| 2016/0138995 A1* | 5/2016 | Trinko ................ G01G 23/36 |
| | | 73/65.09 |
| 2016/0159471 A1* | 6/2016 | Chan .................. B64C 39/024 |
| | | 244/39 |
| 2016/0159472 A1 | 6/2016 | Chan et al. |
| 2016/0195447 A1 | 7/2016 | Nance |
| 2016/0202111 A1* | 7/2016 | Fahey ................ B65D 90/143 |
| | | 177/141 |
| 2016/0376031 A1 | 12/2016 | Michalski et al. |

OTHER PUBLICATIONS

Office Action for U.S. Appl. No. 14/734,894, dated Aug. 25, 2016, Hanlon et al., "Unmanned Aerial Vehicle Physical Metrics Acquisition", 43 pages.

Office Action for U.S. Appl. No. 14/734,940, dated Oct. 5, 2017, Hanlon, "Unmanned Aerial Vehicle Scale Alignment", 26 pages.

Office Action for U.S. Appl. No. 14/734,997, dated Feb. 10, 2017, Hanlon, "Application Program Interface for Weight and Balance Metrics", 29 pages.

Office Action for U.S. Appl. No. 14/734,997, dated Jul. 29, 2016, Hanlon, "Application Program Interface for Weight and Balance Metrics", 21 pages.

* cited by examiner

UNMANNED AERIAL VEHICLE SCALE ALIGNMENT

CROSS-REFERENCE TO RELATED APPLICATIONS

This application is a divisional of, and claims priority to, co-pending, commonly-owned U.S. patent application Ser. No. 14/734,940, filed on Jun. 9, 2015, the entire disclosure of which is incorporated herein by reference.

BACKGROUND

Maintenance protocols used to service and verify operability of a fleet of vehicles often rely on collection of data from the vehicles, which may provide indicators about possible problems with some of the vehicles. The data collection is often accomplished in part by manual inspection of each vehicle. However, manual inspection does not scale well for large fleets of vehicles. Further, manual inspection is error prone and may require a relatively large amount of time to perform as compared to automated tasks. Automated tasks often rely on use of error codes, which may be output by a computing device associated with a vehicle. For example, the computing device may connect to an analysis computer, which may receive an error code from the vehicle via the computing device. However, these systems rely on signals generated by components located onboard a vehicle, and may not practically capture all types of useful data about a vehicle.

Prior to flight, an aircraft is often filled with fuel or equipped with a charged battery to power operations of the aircraft for a specific flight task, such as a delivery task. Weight and balance of an aircraft are important metrics to capture for the aircraft to inform control systems and planning systems to properly prepare for a specific flight task and successfully execute the specific flight task.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5A is an isometric view of two different UAVs placed on the load cell grid. FIG. 5B is a top plan view of the two different UAVs placed on the load cell grid. FIG. 5C is a schematic view of analyzed data resulting from a sample measurement performed by the load cell grid.

FIG. 7A is an isometric view of a UAV placed on the configurable scale. FIG. 7B is a schematic view of positioning mechanisms that position components of the configurable scale for a UAV.

FIG. 9A is an isometric view of a UAV on an inertia device configured to measure a moment of inertia for yaw. FIG. 9B is an isometric view of a UAV on another inertia device configured to measure a moment of inertia for roll and/or pitch.

DETAILED DESCRIPTION

Figure 1:
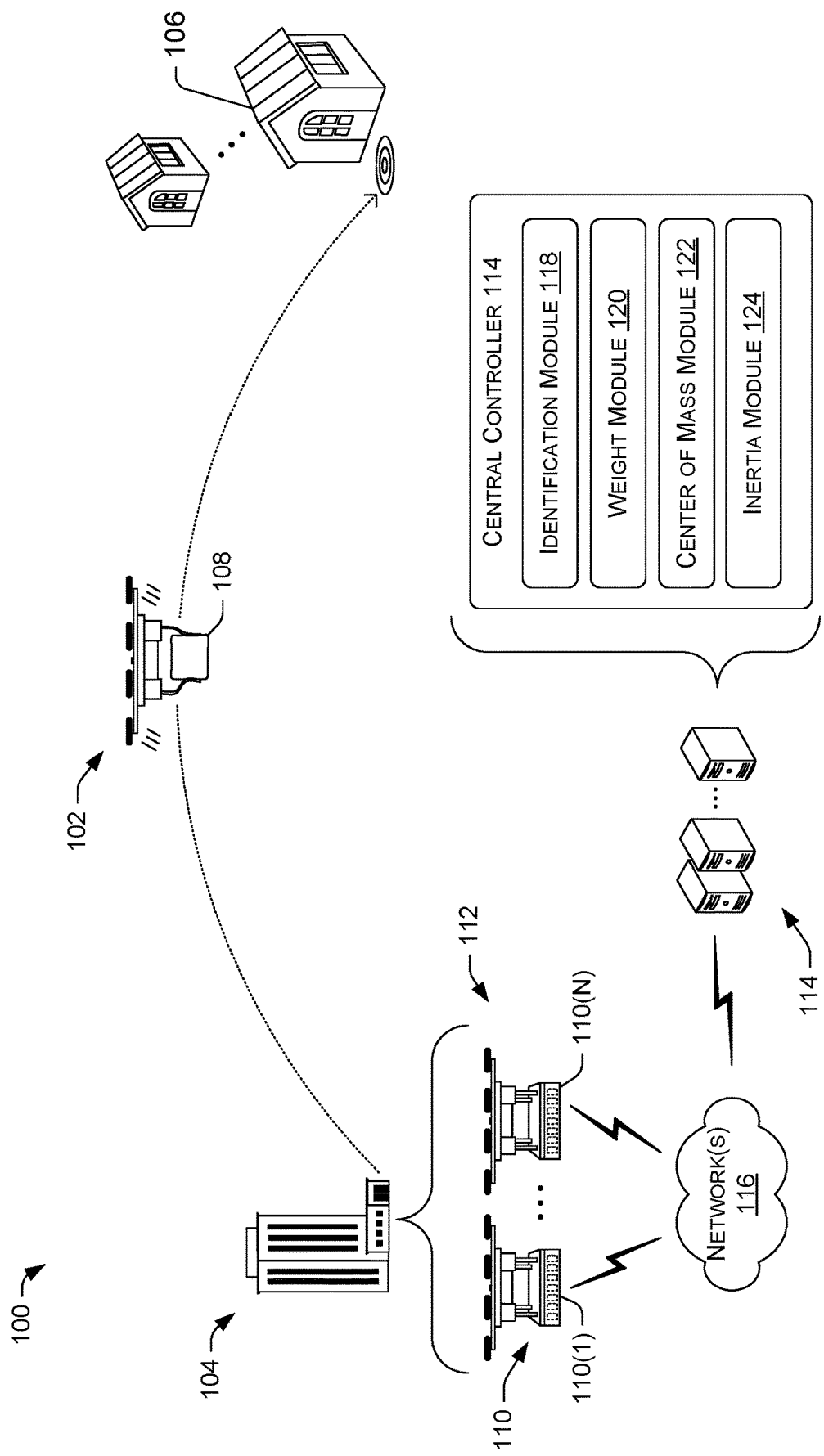
FIG. 1 is a schematic diagram of an illustrative environment that includes illustrative devices to measure physical attributes of unmanned aerial vehicles (UAVs) before and/or after flight. The devices may provide data to a central controller, which may process the data for various uses.

This disclosure is generally directed, at least partly, to collection of physical metrics from unmanned aerial vehicles (UAVs) used to perform package deliveries, the collection performed on a regular or semi-regular basis. Apparatuses, systems, and techniques discussed herein may be used to determine a weight distribution associated with a UAV prior to dispatch of the UAV and/or after the UAV returns from operation (e.g., a flight). For example, one or more UAVs may be placed on or proximate to a physical metrics acquisition (PMA) device. The PMA device may include a grid of load cells or a configurable scale and may be used to determine a distribution of weight of the UAV at three or more points associated with the UAV. The distribution of weight may be used generate analytics, which may include a total weight of a vehicle, a center of mass of the vehicle (in two or more dimensions), power requirements of the UAV for a given flight task (e.g., how much battery power the UAV requires, etc.), and/or other analytics. In some embodiments, the PMA device may perform moment of inertia tests for the UAV to determine moments of inertia associated with roll, pitch, and/or yaw of the UAV.

The PMA device may provide data to a central controller (also referred to herein as a central processor). The central controller may perform at least some of the analytics using the weight distribution and/or other physical metrics acquired from interaction with the UAV. The central controller may then transmit at least some information to other systems, such as a dispatcher system used to dispatch the UAV for a flight task, a power manager system used to select and monitor power consumption by the UAV, a fleet manager used to maintain operation of the UAV, and/or other systems.

In some embodiments, the central controller may identify a UAV based on communication with the UAV prior to or during collection of the physical attributes. For example, the central controller may communicate wirelessly with the UAV to determine a type of the UAV, a current location of the UAV, and/or other information about the UAV. In some embodiments, the central controller may identify the UAV, or attributes of the UAV based on collection of the physical attributes. For example, when the UAV is placed on a grid of load cells, the type of UAV may be determined based on a determined footprint, which may be determined based on the specific load cells that transmit signals indicating physical interaction with the UAV and based on respective known locations of those load cells.

In various embodiments, the central controller may interact with the PMA device to process multiple UAVs concurrently using a fully automated or partially automated process. For example, UAVs that are queued up for a flight task may be placed on or proximate to a PMA device, which may then interact with the UAV to obtain physical metrics to provide a distribution of weight of the UAV. The UAV may be measured prior to or after being equipped with a power source (e.g., fuel, batteries, etc.) and/or prior to or after being equipped with cargo (e.g., a package to be delivered to a destination). The central controller may associate metrics obtained with the respective UAV, even when multiple UAVs are measured concurrently or partially concurrently. The central controller may then perform analytics, and transmit at least some of the analytics to the other system(s), including to a control system of the UAV that was measured. For example, the control system of the UAV may receive a determined data such as a center of mass, weight, and/or moments of inertia, which may be referenced by a stability controller during flight of the UAV to enable the UAV to perform stable flight and possibly improve efficiency by properly managing power resources based on the center of mass, weight, and/or moments of inertia data.

The techniques, apparatuses, and systems described herein may be implemented in a number of ways. Example implementations are provided below with reference to the following figures.

FIG. 1 is a schematic diagram of an illustrative environment 100. The environment 100 shows a UAV 102 traveling between an origination location 104 and a destination 106 as the UAV 102 performs a flight task. The flight task may include delivery of a package 108 to the destination 106; however, other flight tasks are possible. The origination location 104 may be a fulfillment center that stores items to be delivered to various destinations, such as the destination 106. The origination location 104 may include other services, such as dispatch services, maintenance services and engineering services. The activities of UAVs, including the UAV 102 may be at least partially controlled by one or more computing devices associated with the origination location 104. For example, computing devices may direct the UAV to travel to a particular location and perform a particular task, such as deliver a package to a specific location. However, these computing devices may not control every action of the UAV during flight, but may instead rely on at least some level of autonomous flight by controls systems of the UAV.

In accordance with one or more embodiments, the origination location 104 may include one or more physical metrics acquisition (PMA) devices 110, such as PMA devices 110(1)-110(N). The PMA devices 110 may be implemented as separate devices, or may be implemented as a grid of components that may collectively perform operations for multiple UAVs 112. The PMA devices 110 may measure a distribution of weight of each UAV of the multiple UAVs 112. For example, a PMA device may determine at least three different weights associated with different locations on the UAV, which may then be used to determine a total weight of the UAV and a center of mass of the UAV (in at least in two dimensions). In some embodiments, the PMA device may make multiple measurements, possibly after movement of the UAV. The multiple measurements may be used to improve the measurements captured such as by providing more accurate data and/or more specific data (e.g., center of mass in three-dimensional space). At least some PMA devices may take measurements of moments of inertia of the UAV associated with roll, pitch, and/or yaw. In some embodiments, these PMA devices may include specialized couplers, arms, or other features to enable rotating the UAV to perform the measurements.

The PMA devices 110 may transmit data to a central controller 114 (also referred to as a central processor) through one or more networks 116. The networks 116 may include wired and/or wireless networks, which enable secure communication of data between at least the PMA devices and the central controller 114. In some embodiments, the networks 116 may provide connectivity between the central controller and other devices and/or systems, such as a UAV control system associated with one of the UAVs 112.

As shown in FIG. 1, the central controller 114 may include various modules that interact with the PMA devices 110 and/or perform operations using data obtained by the PMA devices 110. The central controller 114 may include an identification (ID) module 118, a weight module 120, a center of mass (CM) module 122, and an inertia module 124, among other possible modules. Each module is discussed in turn.

The ID module 118 may determine which UAV corresponds to data obtained via the PMA device. For example, when the UAV is placed on the PMA, the PMA and/or the central controller 114 may determine an identification of the UAV by physical examination, optical examination (e.g., image analysis), radio communications via a transceiver (e.g., radio frequency identification, etc.), and/or other communications or techniques.

The weight module 120 may determine a distribution of weight of the UAV based on measurements obtained from the PMA device(s) 110. For example, the PMA devices 110 may provide three or more sets of data, each set including a weight and coordinates associated with that weight (or information used to determine the coordinates). The weight module 120 may determine the total weight of the UAV based on the weight distribution data. The weight module 120 may compare the total weight to an expected weight, determine power needs using the total weight and information about a flight task (e.g., distance, duration, etc.), and/or other use the total weight information for other purposes, including transmitting the total weight and possibly other information about the UAV to other systems.

The CM module 122 may determine a distribution of weight of the UAV based on measurements obtained from the PMA device(s) 110. For example, the CM module 122 may receive the distribution of weight of the UAV from the weight module 120. The CM module 122 may analyze the weight data from the different locations to determine a center of mass of the UAV in at least two dimensions. In some embodiments, the CM module 122 may obtain additional data for another distribution of weight associated with a different orientation of the UAV (e.g., the UAV weighed when positioned sideways or in a different orientation than when the prior distribution of weight was accessed). The additional data may enable the CM module 122 to determine the center of mass for the UAV in three dimensions. The CM module 122 may transmit the center of mass data to a control system of the UAV and/or to other systems. For example, the UAV may incorporate the center of mass data in a stability controller, which may enable the UAV to experience improved flight handling, among other possible benefits.

The inertia module 124 may access measurement data associated with moments of inertia of the UAV from the PMA device. The moments of inertia may be associated with pitch, roll, and/or yaw of the UAV. The inertial module 124 may convert and/or analyze the measurement data to determine one or more of the different moments of inertial expressed as moment of inertia data. Measurement of the moments of inertia is described with reference to FIGS. 9A and 9B. The inertia module 124 may transmit the moment of inertia data to a control system of the UAV and/or to other systems. For example, the UAV may incorporate the moment of inertia data in a stability controller, which may enable the UAV to experience improved flight handling, among other possible benefits.

Figure 2:
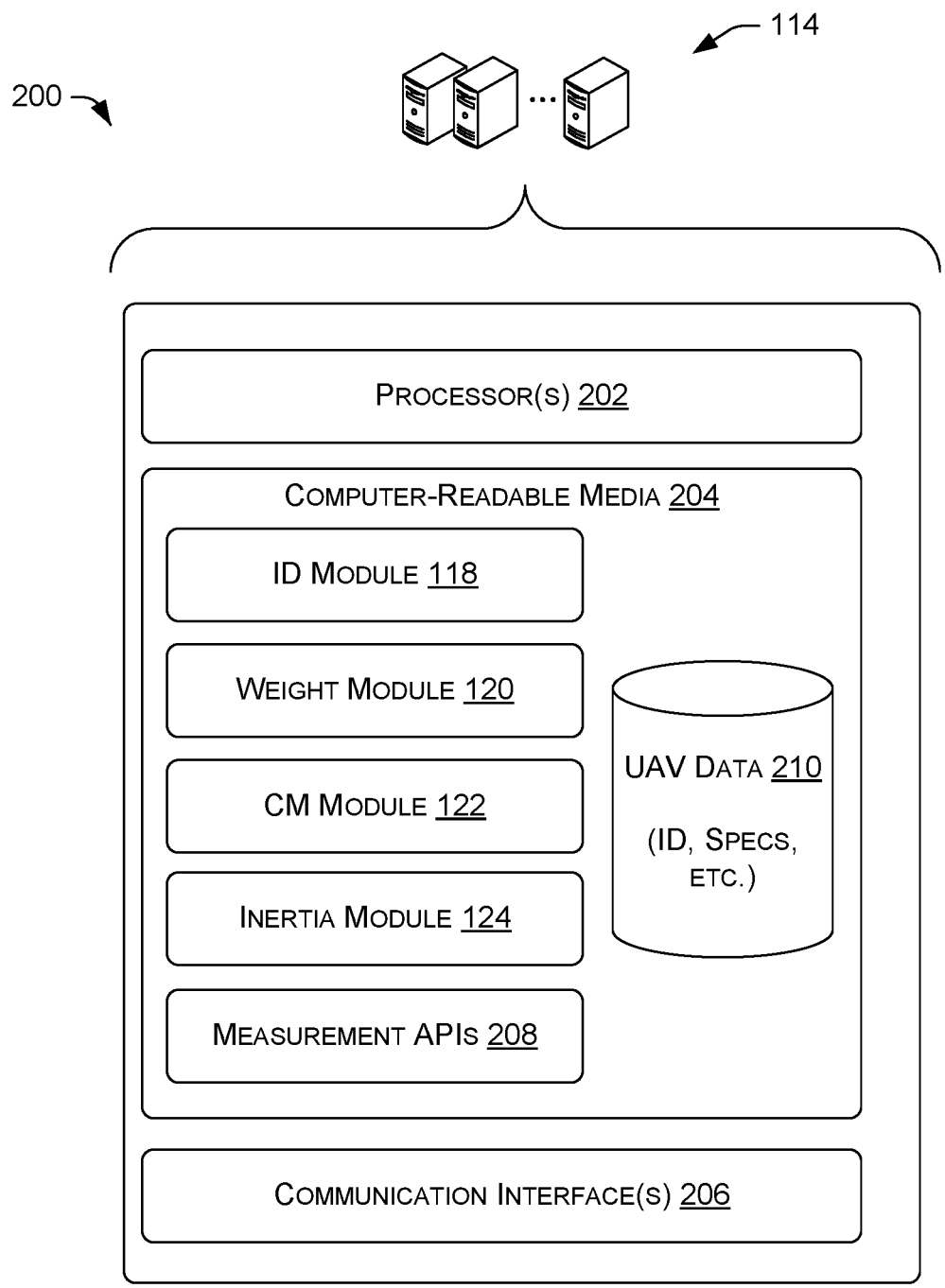
FIG. 2 is a block diagram of an illustrative computing architecture of the central controller shown in FIG. 1.

FIG. 2 is a block diagram of an illustrative computing architecture 200 of central controller 114. The architecture 200 may include one or more processors 202 and one or more computer readable media 204 that stores various modules, applications, programs, or other data. The computing architecture may be implemented in a non-distributed environment or a distributed environment (e.g., cloud services, etc.). The central controller 114 may include communication interfaces 206 that enable the central controller 114 to communicate with other systems via a network, such as the networks 116 discussed with reference to FIG. 1. The communication interfaces 206 may include one or more transceivers, radio frequency identifier (RFID) receivers, imaging devices (e.g., cameras, code scanners, etc.), and/or communication interfaces which can receive data, transmit data, or both.

The computer-readable media 204 may include instructions that, when executed by the one or more processors 202, cause the processors to perform the operations described herein for the central controller 114. Embodiments of at least some functionality of the central controller 114 may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be performed by a download.

In some embodiments, the computer-readable media 204 may store the ID module 118, the weight module 120, the CM module 122, and the inertia module 124. The computer-readable media 204 may also store measurement application program interfaces (APIs) 208 and UAV data 210. The measurement APIs 208 may enable the central controller 114 to receive data from the PMA devices, such as the PMA devices 110 discussed with reference to FIG. 1. For example, the measurement APIs 208 may enable transmission of formatted data from the PMA device to the central controller, which may then be further processed by modules of the central controller 114. The measurement APIs 208 may enable transmission and communication with other services, such as a dispatcher system used to dispatch a UAV for a flight task, a power manager system used to select and monitor power consumption by the UAV, a fleet manager used to maintain operation of the UAV, and/or other systems. Thus, the measurement APIs 208 may facilitate communication of standardized data between various devices and/or services. Additional discussion of the measurement APIs 208 is included below with reference to FIG. 10.

The UAV data 210 may include a structural model, information about specific UAVs, and/or general information about types of UAVs. For example, the UAV data 210 may include a database that associated unique identifiers of different UAVs with structural models of those UAVs, such as models that include physical dimensions and/or computer aided design (CAD) information. Other information may include flight tasks, payload, power consumption, and other relevant data. The UAV data 210 may be used to determine a type of the UAV based on a received ID, which the central controller may receive in various ways as discussed above. In embodiments where the central controller determines the UAV based on a footprint, as discussed above, the footprint data may be matched to data in the UAV data to determine a type of the UAV, for example. The central controller 210 may read data from the UAV data 210, write data to the UAV data 210, or both. In some embodiments, the UAV data 210 may be remotely located data that is accessible by the central controller 114, but not stored in the central controller or in a same location as the central controller 114.

Figure 3:
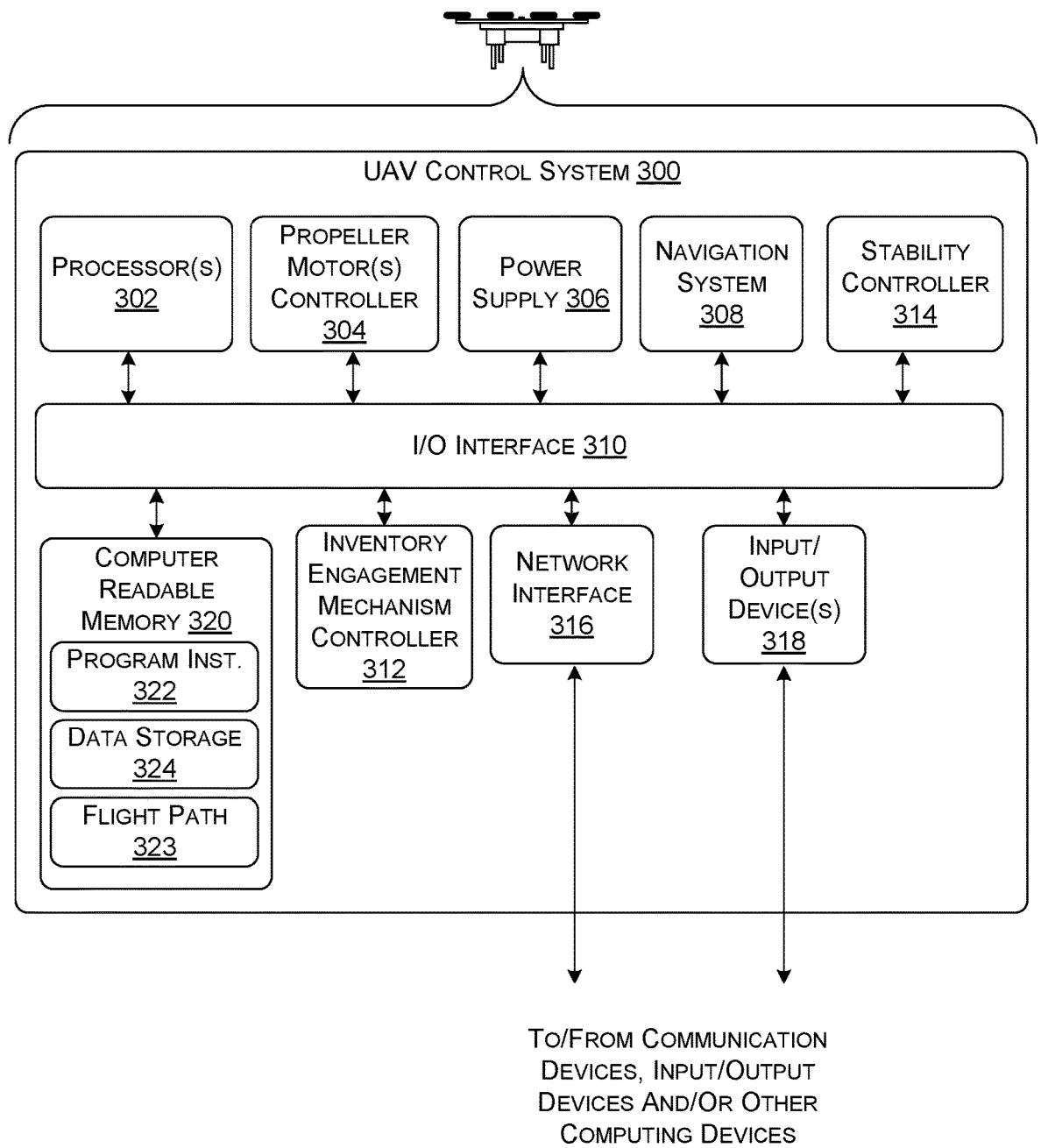
FIG. 3 is a block diagram of an illustrative control system of the UAV shown in FIG. 1.

FIG. 3 is a block diagram of an illustrative control system 300 of the UAV. In various examples, the block diagram may be illustrative of one or more aspects of the UAV control system 300 that may be used to implement the various systems, devices, and techniques discussed above. In the illustrated implementation, the UAV control system 300 includes one or more processors 302, coupled to a non-transitory computer readable storage medium 320 via an input/output (I/O) interface 310. The UAV control system 300 may also include a propeller motor controller 304, power supply module 306, and/or a navigation system 308. The UAV control system 300 further includes an inventory engagement mechanism controller 312, a stability controller 314, a network interface 316, and one or more input/output devices 318.

In various implementations, the UAV control system 300 may be a uniprocessor system including one processor 302, or a multiprocessor system including several processors 302 (e.g., two, four, eight, or another suitable number). The processor(s) 302 may be any suitable processor capable of executing instructions. For example, in various implementations, the processor(s) 302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 302 may commonly, but not necessarily, implement the same ISA.

The non-transitory computer readable storage medium 320 may be configured to store executable instructions, data, flight paths, and/or data items accessible by the processor(s) 302. In various implementations, the non-transitory computer readable storage medium 320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 320 as program instructions 322, data storage 324 and flight path data 326, respectively. In other implementations, program instructions, data, and/or flight paths may be received, sent, or stored upon different types of computer-accessible media, such as non-transitory media, or on similar media separate from the non-transitory computer readable storage medium 320 or the UAV control system 300. Generally speaking, a non-transitory, computer readable storage medium may include storage media or memory media such as flash memory (e.g., solid state memory), magnetic or optical media (e.g., disk) coupled to the UAV control system 300 via the I/O interface 310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 316.

In one implementation, the I/O interface 310 may be configured to coordinate I/O traffic between the processor(s) 302, the non-transitory computer readable storage medium 320, and any peripheral devices, the network interface or other peripheral interfaces, such as input/output devices 318. In some implementations, the I/O interface 310 may perform any necessary protocol, timing or other data transformations to convert data signals from one component (e.g., non-transitory computer readable storage medium 320) into a format suitable for use by another component (e.g., processor(s) 302). In some implementations, the I/O interface 310 may include support for devices attached through various types of peripheral buses, such as a variant of the Peripheral Component Interconnect (PCI) bus standard or the Universal Serial Bus (USB) standard, for example. In some implementations, the function of the I/O interface 310 may be split into two or more separate components, such as a north bridge and a south bridge, for example. Also, in some implementations, some or all of the functionality of the I/O interface 310, such as an interface to the non-transitory computer readable storage medium 320, may be incorporated directly into the processor(s) 302.

The propeller motor(s) controller 304 communicates with the navigation system 308 and adjusts the power of each propeller motor to guide the UAV along a determined flight path. The power supply module 306 may control the charging and any switching functions associated with one or more power modules (e.g., batteries) of the UAV.

The navigation system 308 may include a GPS or other similar system that can be used to navigate the UAV to and/or from a location. The inventory engagement mechanism controller 312 communicates with the actuator(s) or motor(s) (e.g., a servo motor) used to engage and/or disengage inventory. For example, when the UAV is positioned over a level surface at a delivery location, the inventory engagement mechanism controller 312 may provide an instruction to a motor that controls the inventory engagement mechanism to release the inventory.

The stability controller 314 may receive information from the central controller 114, such as a total weight for the UAV, a center of balance for the UAV, and/or moments of inertia associated with roll, pitch, and/or yaw. The stability controller 314 may update flight controls and/or parameters using the data from the central controller 114, such as to update power controls, tilt settings, and/or other flight settings, which result in stable flight. For example, the stability controller may update coefficients associated with power levels for each rotor based on the center of balance data. The coefficients, once updated, may allow the UAV to hover in a calm environment with little or no drive caused by the center of balance being different than an exact center point between the rotors.

The network interface 316 may be configured to allow data to be exchanged between the UAV control system 300, other devices attached to a network, such as other computer systems, and/or with UAV control systems of other UAVs. For example, the network interface 316 may enable wireless communication between numerous UAVs. In various implementations, the network interface 316 may support communication via wireless general data networks, such as a Wi-Fi network. For example, the network interface 316 may support communication via telecommunications networks such as cellular communication networks, satellite networks, and the like.

Input/output devices 318 may, in some implementations, include one or more displays, image capture devices, thermal sensors, infrared sensors, time of flight sensors, accelerometers, pressure sensors, weather sensors, airflow sensors, etc. Multiple input/output devices 318 may be present and controlled by the UAV control system 300. One or more of these sensors may be utilized to assist in landings as well as avoiding obstacles during flight.

As shown in FIG. 3, the memory may include program instructions 322 which may be configured to implement the example processes and/or sub-processes described above. The data storage 324 may include various data stores for maintaining data items that may be provided for determining flight paths, retrieving inventory, landing, identifying a level surface for disengaging inventory, causing movement of ballast, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 300 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 300. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 300 may be transmitted to the UAV control system 300 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Figure 4:
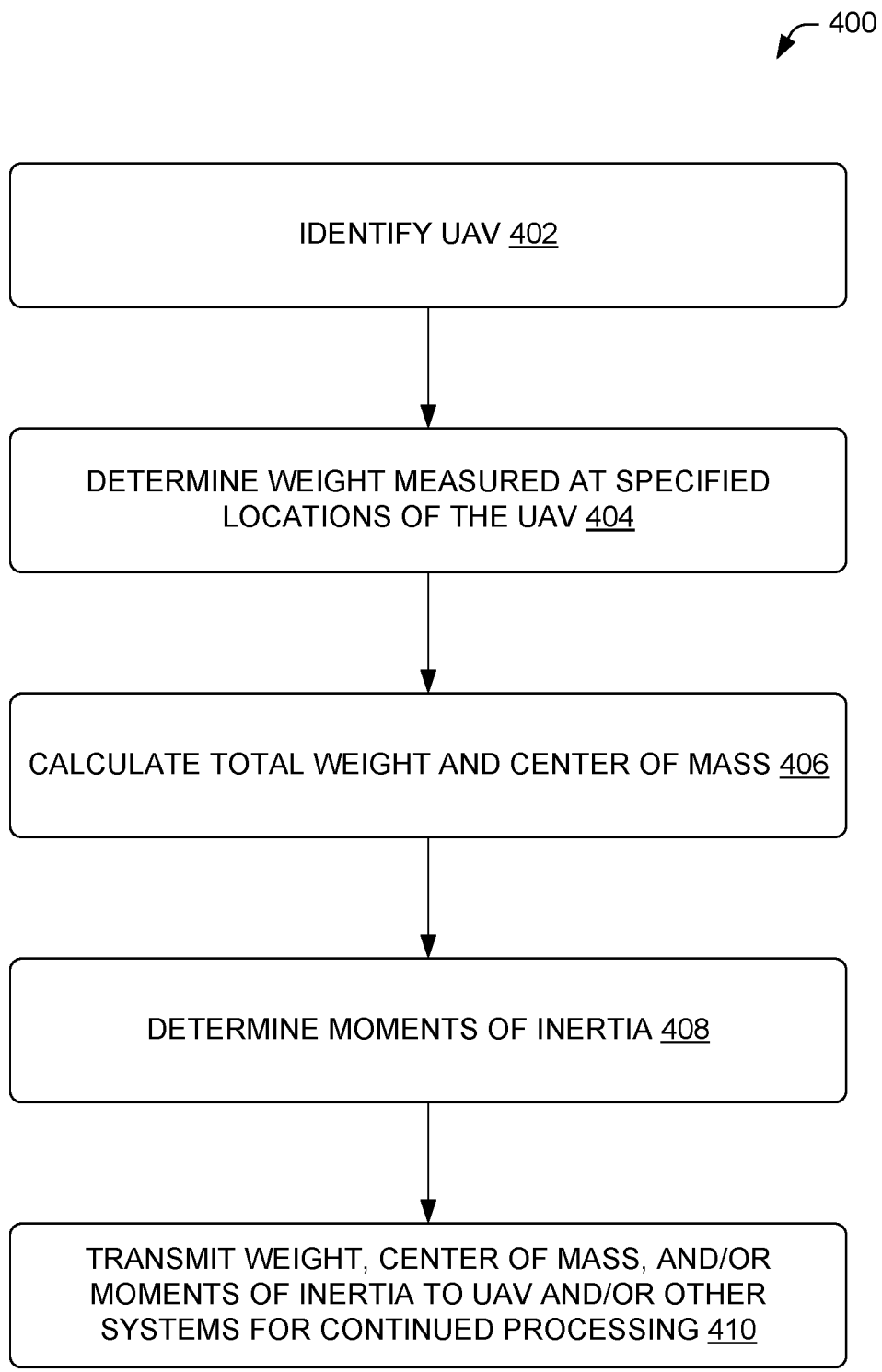
FIG. 4 is a flow diagram of an illustrative process to measure physical attributes of one or more UAVs.
Figure 6:
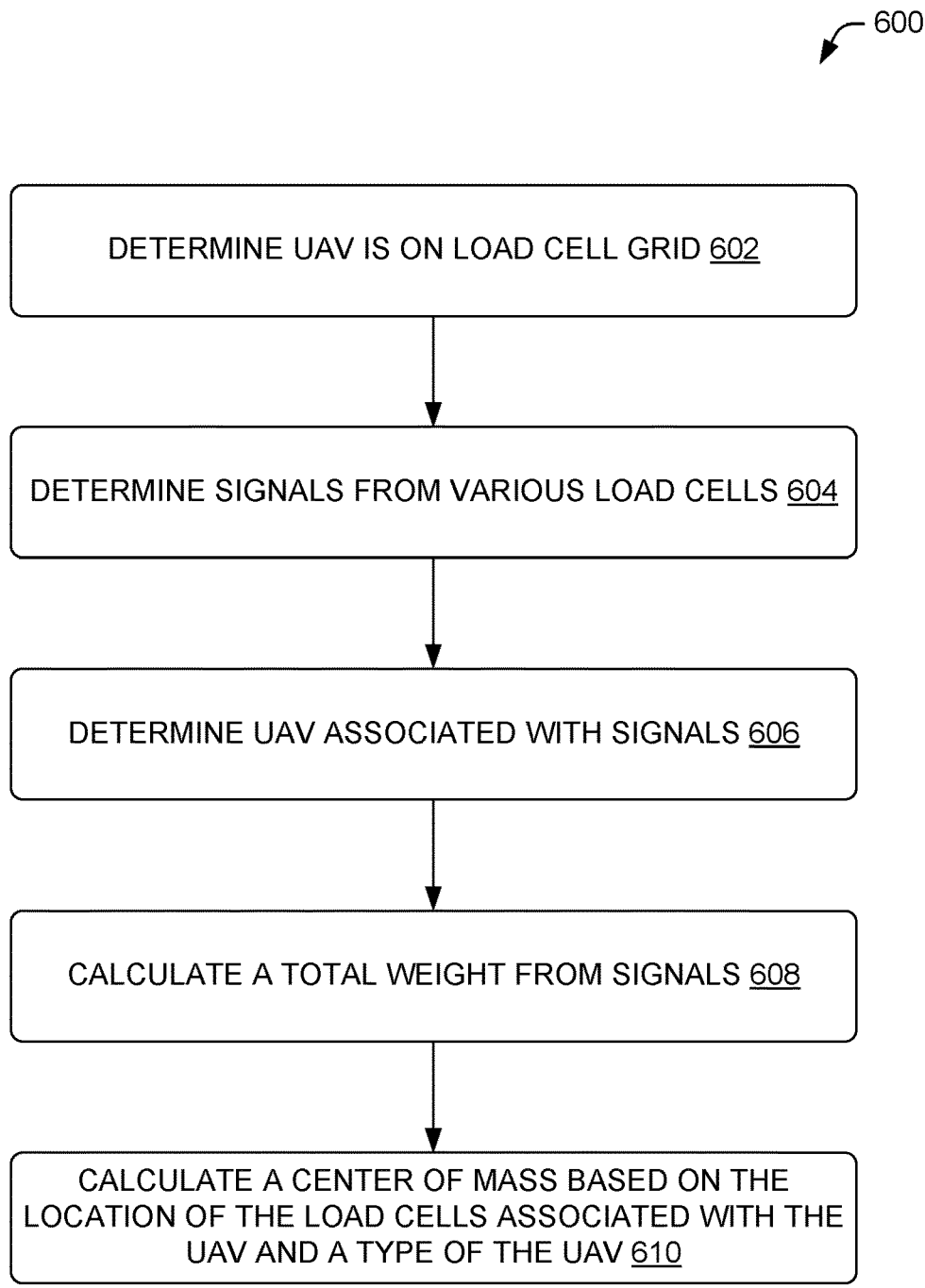
FIG. 6 is a flow diagram of an illustrative process to measure a weight distribution of at least one UAV using the load cell grid and perform other analytics using the weight distribution.
Figure 8:
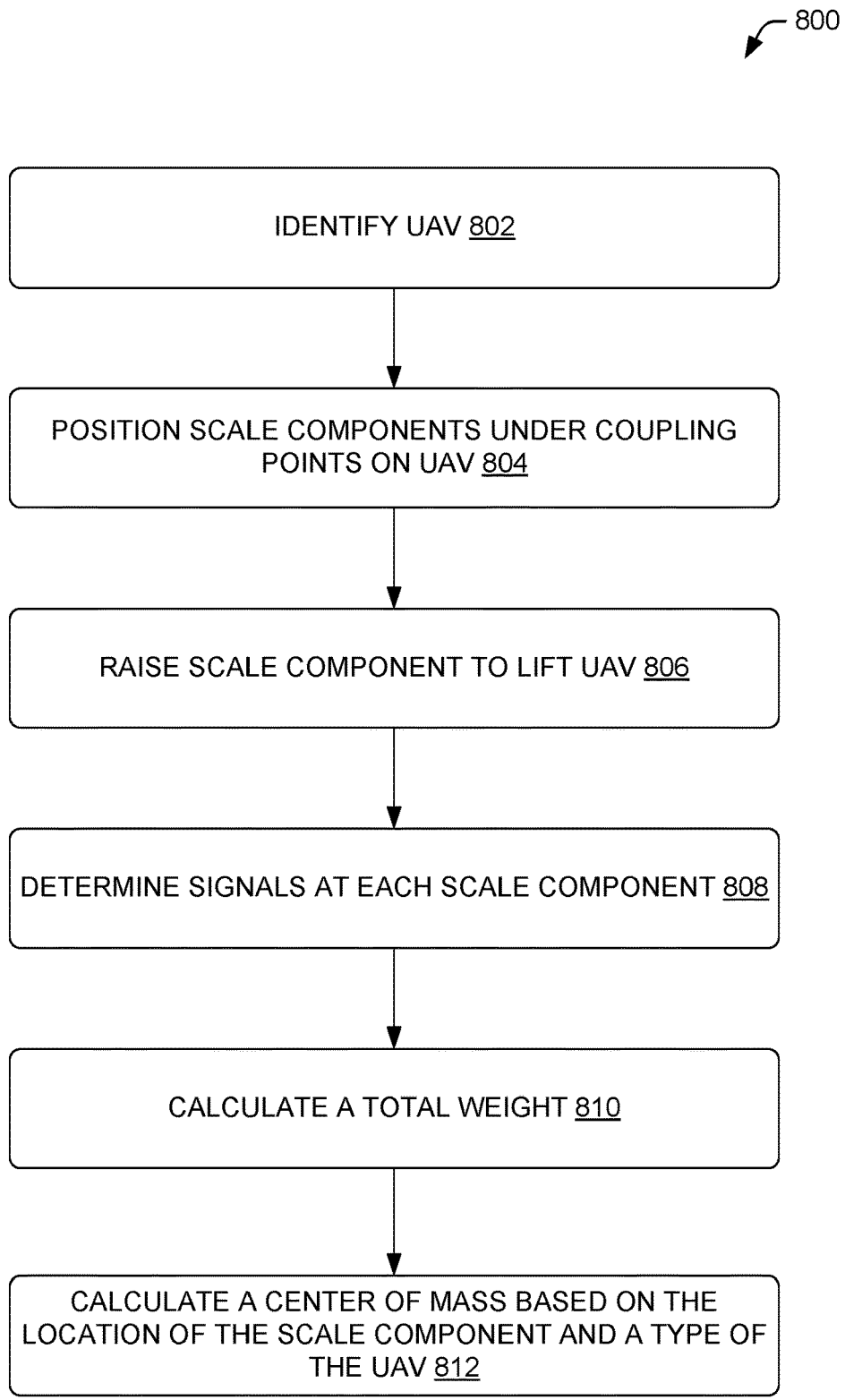
FIG. 8 is a flow diagram of an illustrative process to measure a weight distribution of a UAV using the configurable scale and to perform other analytics using the weight distribution.

FIGS. 4, 6, and 8 are flow diagrams of illustrative processes. The processes are illustrated as a collection of blocks in a logical flow graph, which represent a sequence of operations that can be implemented in hardware, software, a physical process, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 4 is a flow diagram of an illustrative process 400 to measure physical attributes of one or more UAVs. The process 400 is described with reference to the environment 100 and the computer architecture 200.

At 402, the ID module 118 may identify presence of a UAV associated with a PMA device, such as the PMA device 110 shown in FIG. 1. The ID module 118 may determine the identification of the UAV based on a radio signal from the UAV and/or the PMA device, an optical signal from the UAV and/or the PMA device, an image of the UAV, and/or by data received from the PMA device which identifies a characteristic of the UAV, such as a unique footprint associated with the UAV. In some embodiments, the receipt of the UAV may trigger the ID module 118 to initiate acquisition of physical metrics. In various embodiments, the ID module 118 may distinguish multiple UAVs that are associated with the PMA device at a same time, such as when the PMA device enables concurrent weighing and measuring information about multiple UAVs.

At 404, the PMA device may determine weight associated with different locations of the UAV. Different versions of the PMA device are shown and described in further detail with reference to FIGS. 5A-5C, 7A, and 7B. The PMA device may determine different weights using different weighing devices, such as load cells and/or other scales that rely on physical displacement of biasing devices to create a change in electrical signal, which is then transmitted to the weight module 120. The signal may change in a predictable manner based on changes in the force applied to the load cell to enable the signal to be converted to a weight. Each weight may be associated with a location, such as a location of a foot, skid, or a piece of landing gear of the UAV. Thus, the weight module 120 may receive at least three sets of data, where each set of data includes a weight and a corresponding location associated with the weight. In some embodiments, the operation 404 may occur multiple times to determine average or media weight information. In various embodiments, the UAV may be oriented in a different way (e.g., sideways, rotated, etc.) between determinations, which may enable validation of information and/or calculation of a center of mass in three dimension instead of in two dimensions.

At 406, the weight module 120 may calculate a total weight of the UAV based on the data from the operation 404. In some embodiments, the total weight may be a sum of the weight values. At 406, the CM module 122 may calculate the center of mass of the vehicle based at least in part on the data from the operation 404. In some embodiments, the CM module 122 may use specific information about the UAV identified at the operation 402 when calculating the center of mass. For example, the CM module 122 may utilize known information about location of feet, skids, or landing gear of the UAV in the determination of the center of mass.

At 408, the PMA device, or another different PMA device, may provide measurement data to the inertia module 124 to enable the inertial module 124 to determine a moment of inertia associated with roll, pitch, and/or yaw of the UAV. In some embodiments, the moment of inertia may be measured less frequently than the weight, and possibly by a different PMA device, such as the PMA devices shown in FIGS. 9A and 9B.

At 410, the measurement APIs 208 may transmit the weight, center of mass, and/or moment of inertia data to one or more other systems or devices, such as the UAV. The other systems may use the physical metrics associated with the UAV for further analysis, for decision making purposes, to update system controls of the UAV, or for other reasons. For example, weight information may be used to select a power source (e.g., a battery), and/or ensure the UAV has power to complete an assigned flight task.

Figure 5A:
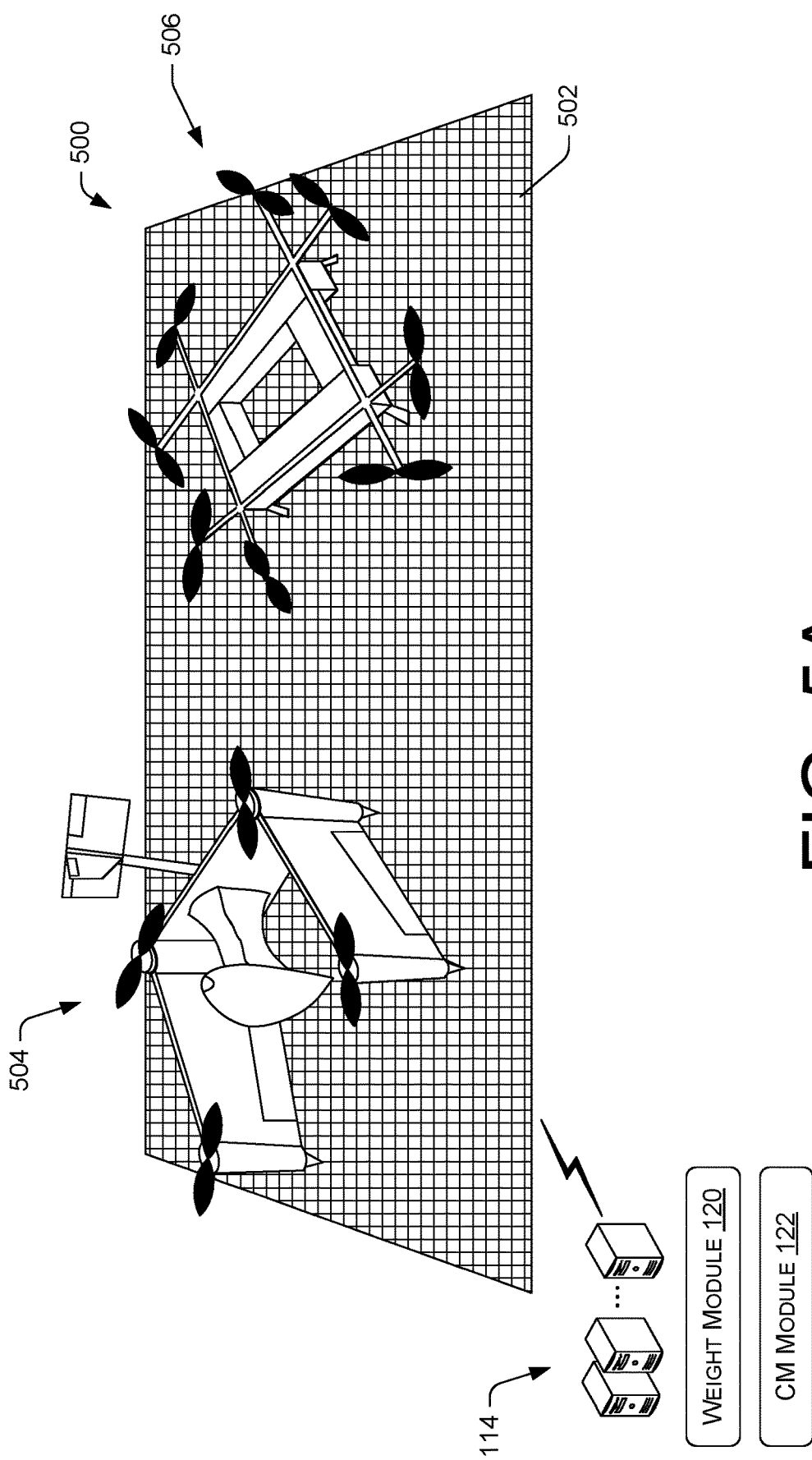
FIGS. 5A, 5B, and 5C show an illustrative load cell grid used to measure a weight distribution of a UAV, among other possible uses.

FIG. 5A is an isometric view of two different UAVs placed on an illustrative load cell grid 500 used to measure a weight distribution of each UAV, among other possible uses. The load cell grid 500 may be formed of a grid of load cells 502 that each have a known location, possibly associated with an identifier (ID) of each load cell. The load cells 502 may be located adjacent to one another to create a surface for a UAV to be placed up or rest upon. The load cells 502 may be arranged in a grid that includes linear rows or staggered or random arrangements of load cells. The term "load cell" is used herein to refer to any type of device that can output a signal associated with a force exerted against the load cell. In some embodiments, the load cells 502 may experience slight deflection in response to application of a force against the load cell. The load cells 502 may be implemented using biasing devices or may be implemented without the use of biasing devices. Each load cell may have a known coordinate or location. When a load cell experiences a force, and thus detects weight applied to the load cell, the load cell may register a change in electrical signal that surpasses a threshold amount. In some embodiments, the electrical signal may be representative of a change in voltage, current, or frequency. In response to the electrical signal exceeding a threshold, the load cell may be designated as being active, and thus having a measurement of a UAV or portion of the UAV. The signal value and location of the load cell (possibly associated with an identifier of the load cell) may be transmitted to the central controller, which may use process the information. For example, the central controller may convert the signal into a weight value and may convert the identifier of the load cell into a location coordinate using a lookup table or other reference data.

As shown in FIG. 5A, a first UAV 504 and a second UAV 506 may be placed on the load cell grid 500 in preparation for a physical metrics acquisition, which may occur concurrently for the two UAVs. The load cell grid 500 may be in communication with the central controller 114 via the networks 116, which may be a wired or wireless connection. The data collected by the load cell grid 500 may be processed by the weight module 120, the CM module 122, or both. In an example, operation, one or more UAVs may be placed on the load cell grid. The load cell grid may register a reading (measurement) at a first time, which may result in transmission of signals to the central controller. Additional readings may be determined at different times, possibly after some movement or changes in orientation of the UAVs. In some embodiments, the load cells may be continually "reading" and providing measurements.

Figure 5B:
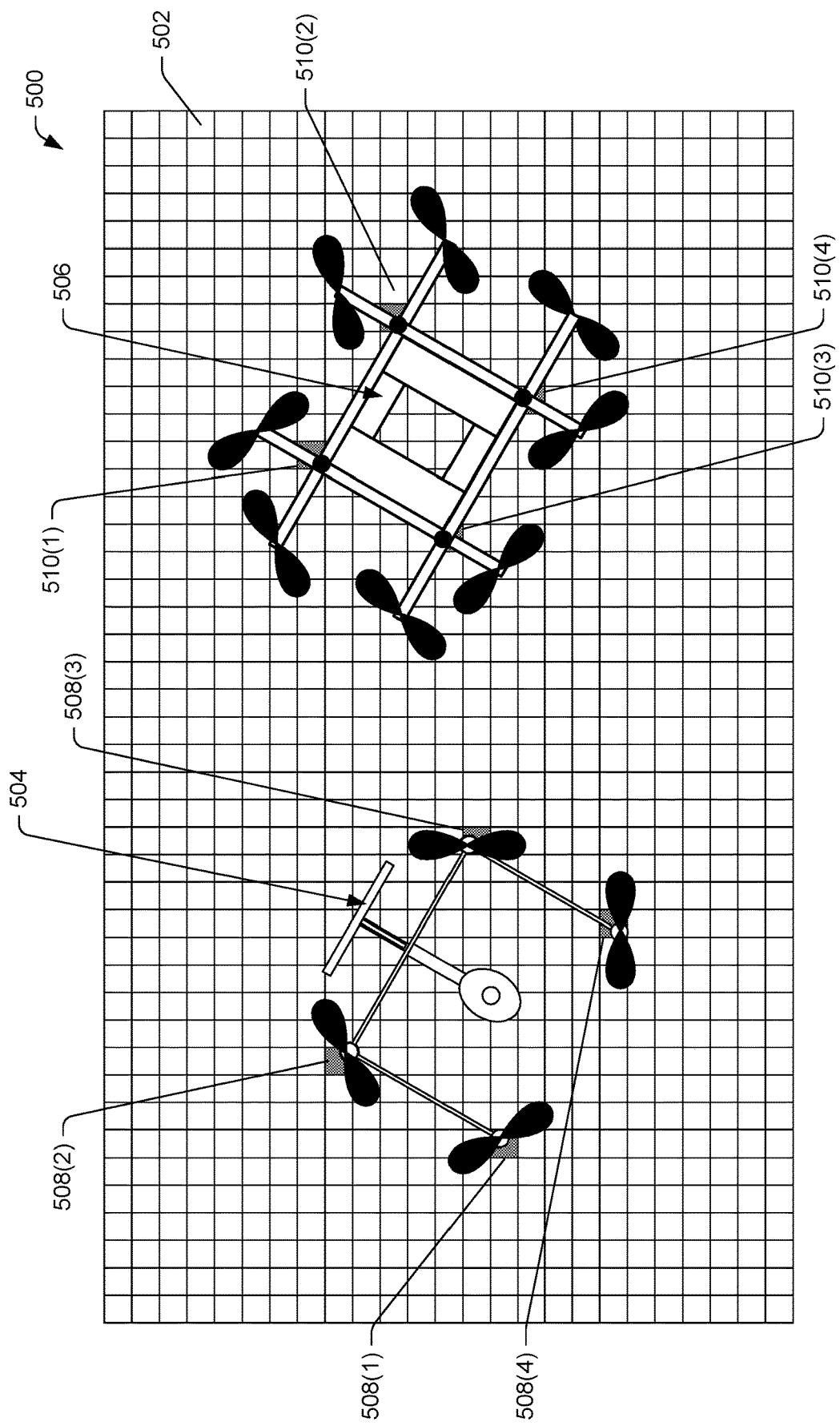

FIG. 5B is a top plan view of the two different UAVs placed on the load cell grid. Load cells 508(1)-(4) and load cells 510(1)-(4) are shown as registering signals greater than the threshold. The number of signals is shown as four in this example, but any number of load cells may register signals greater than the threshold. In some embodiments, when a foot, skid, or a piece of landing gear overlays two load cells, such as by touching adjacent load cells, each of those load cells may transmit a change in signal, which may result in selection of both or multiple load cells for a "single" point to contact with a UAV. As discussed below, this information may be used when assigning a location to these weights.

Figure 5C:
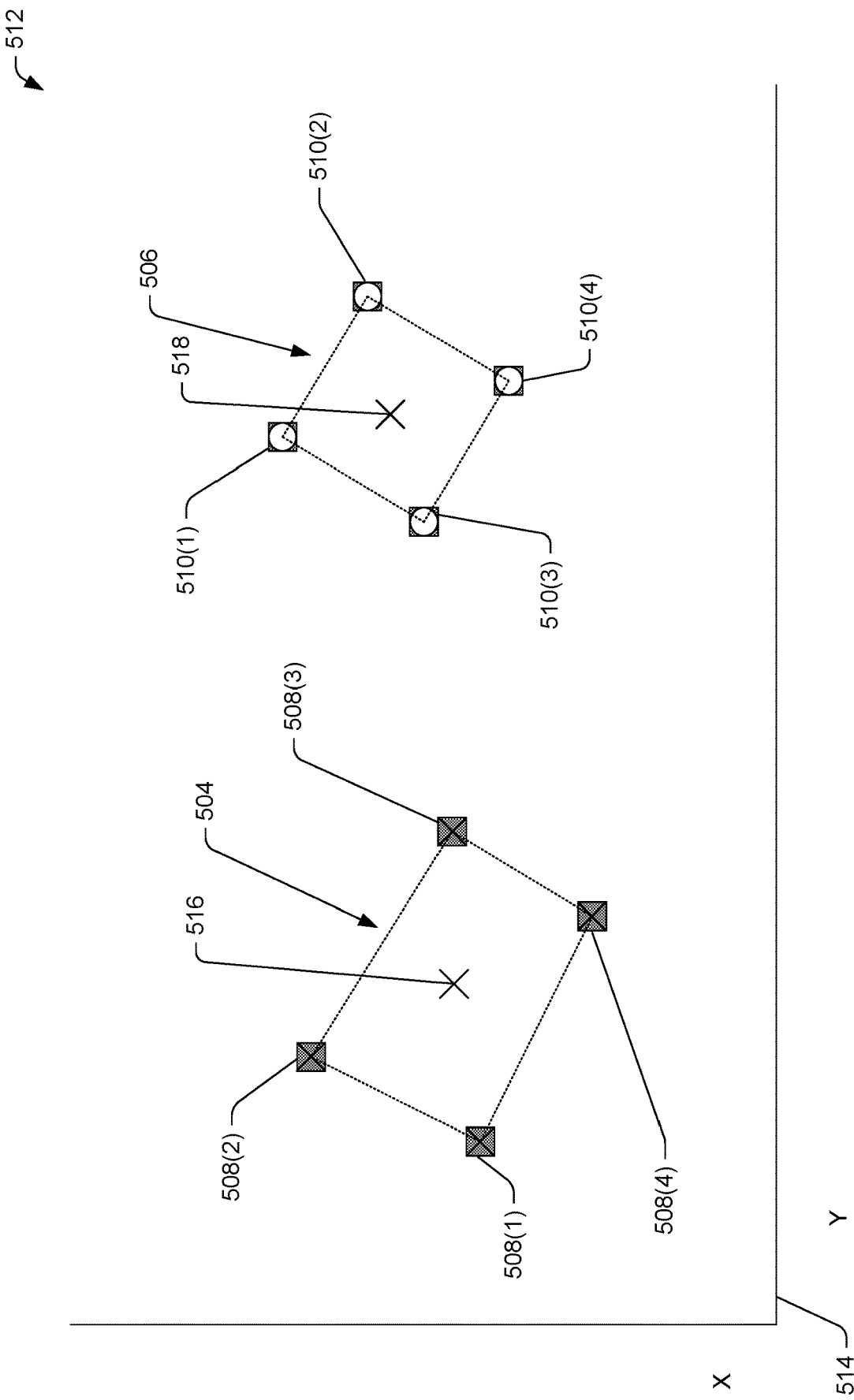

FIG. 5C is a schematic view of data 512 resulting from a sample measurement performed by the load cell grid. The data 512 is shown as plotted in a Cartesian coordinate system (X axis, Y axis) for illustrative purposes. Other coordinate systems may be used. Each load cell of the load cells 508(10-(4) and 510(1)-(4) have a known location and known recorded signal.

The ID module 118 may identify which groups of the identified load cells are associated with each UAV. For example, the ID module 118 may determine that the load cells 508(10-(4) are associated with the first UAV 504 based on optical information, radio signals, a footprint match (using the location of the load cells compared to known footprint profiles stored in the UAV data 210), and/or via other data from other techniques. Similarly, the ID module 118 may determine that the load cells 510(1)-(4) are associated with the second UAV 506. In some embodiments, a UAV may be identified based on a time when the load cells register a change in signal, which may coincide with a dispatch of a known UAV to the load cell grid, for example.

The weight module 120 may determine a weight for the first UAV 504 based on the signals from the load cells 508(1)-(4) and a weight for the second UAV 506 based on the signals from the load cells 510(1)-(4).

The CM module 122 may determine a first center of mass 516 associated with the first UAV 504 based on the weights and locations of the load cells 508(1)-(4). The CM module 122 may determine a second center of mass 518 associated with the second UAV 506 based on the weights and locations of the load cells 510(1)-(4). In instances where adjacent load cells include signals that exceed the threshold, an adjusted location may be assigned to those load cells to create a single point having a location and a weight. The single location may be determined based in part on the ratio of weight from the adjacent load cells. A size of a surface area of the load cells may be correlated with an accuracy of the center of mass. Thus, a grid having many small load cells may produce more granular, and more accurate, location information, as compared to a grid that includes fewer and larger sized load cells having a larger surface area.

FIG. 6 is a flow diagram of an illustrative process to measure a weight distribution of a UAV using the load cell grid and perform other analytics using the weight distribution. The process 600 is described with reference to the environment 100, the computer architecture 200, and the load cell grid 500.

At 602, the ID module 118 may determine that a UAV is located on the load cell grid 500. For example, the ID module 118 may receive signals from load cells that record changes in signals due to force exerted by the UAV on the load cells.

At 604, the weight module 120 may receive the signals and identification of load cells that have a signal that is greater than a threshold value. For example, the weight module 120 may receive information from the load cells 508(1)-(4), and possibly from more load cells depending on the number of UAVs on the load cell grid and the number of points of contact for each of the UAVs.

At 606, the ID module 118 may determine a subset (or all) of the load cells that are associated with a UAV. The ID module 118 may determine the association of the load cells to the UAV based on known information about a location of the UAV on the load cell grid, possibly using imaging data, radio signals (e.g., via triangulation, etc.), proximity sensing, and/or other information. In some embodiments, the ID module 118 may use the location information associated with load cells to create a footprint, which may then be matched or associated with a UAV, such as a specific type of UAV having a same or similar footprint profile. Regardless of technique, at 606, load cells having signals that exceed the threshold are associated with a UAV.

At 608, the weight module 120 may determine a total weight associated with the various signals assigned to a same UAV. For example, the weight module 120 may convert the signals into weights and then sum the weights to create a total weight associated with the UAV.

At 610, the CM module 122 may calculate a center of mass based on the weights or signals of the load cells assigned to the same UAV and location information associated with those load cells. In some embodiments, the center of mass may be expressed in two dimensions. However, when the UAV includes signal measurements in different orientations, the CM module 122 may determine the center of mass in three dimensions.

Figure 7A:
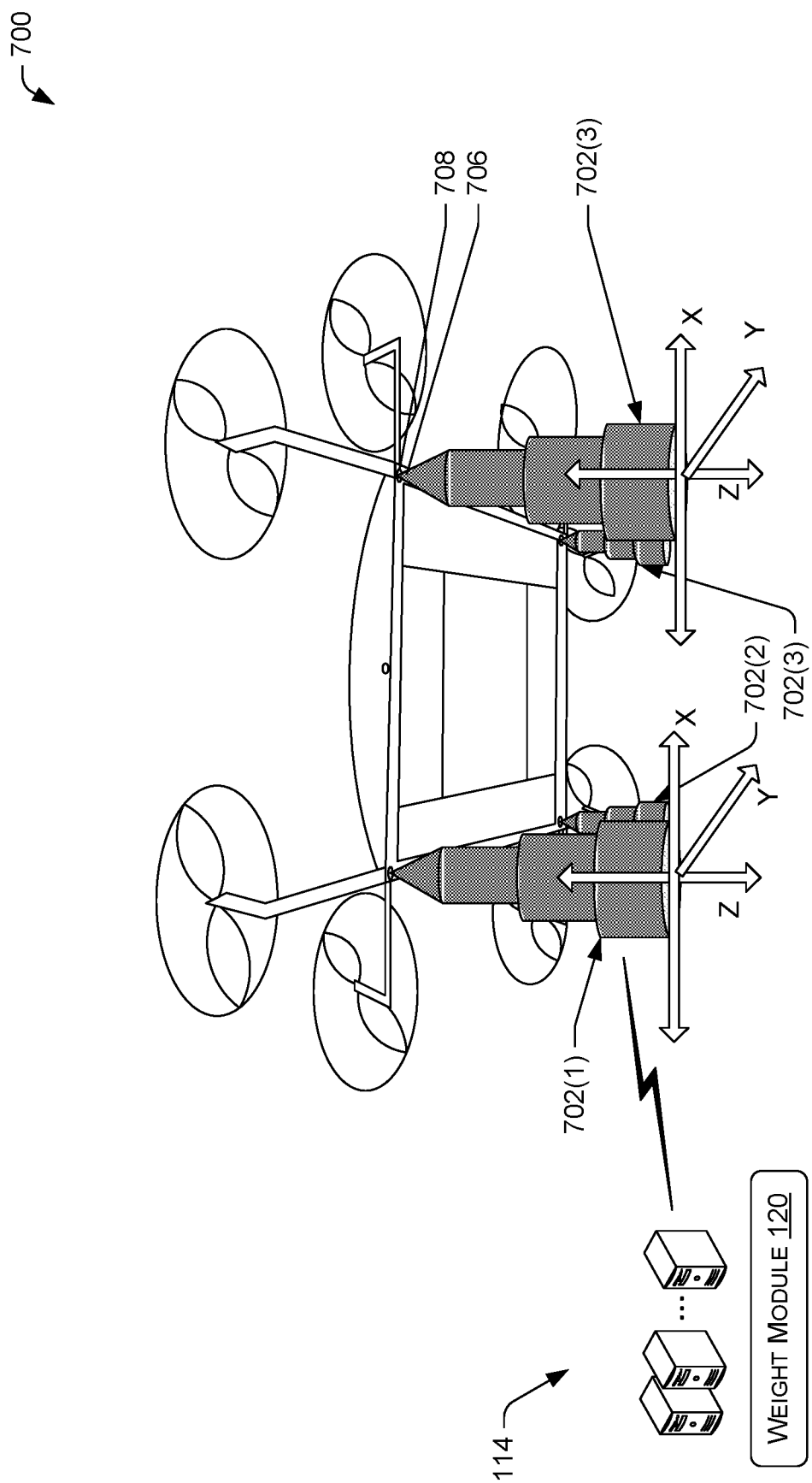
FIGS. 7A and 7B show an illustrative configurable scale used to measure a weight distribution of a UAV, among other possible uses.

FIG. 7A is an isometric view of a UAV placed on the configurable scale device 700 used to measure a weight distribution of a UAV, among other possible uses. The configurable scale device 700 may be used to couple to different UAVs at different locations for each UAV, and to create physical measurements of those UAVs. Thus, the configurable scale device 700 may be configured for each different UAV to enable the configurable scale device 700 to perform physical measurements of a specific UAV.

The configurable scale device 700 may include a plurality of movable scale components 702(1)-(4) used to weigh a UAV 704. In some embodiments, the number of scale components may be four; however, more or fewer scale devices may be used. Each scale device may include a scale, which may be implemented as a load cell (as described above), and output a signal in response to a load being applied to the scale. The signal may change in a predictable manner based on changes in the force applied to the scale to enable the signal to be converted to a weight. Each scale may be moveable in each of the three axis of a Cartesian coordinate system (X axis, Y axis, Z axis). For example, each scale component may move along the X and Y axes using a rail mechanism and telescoping arms, and move along the Z axis using a telescoping body. The movement along the Z axis may enable the scale component to engage the UAV. In some embodiments, the scale component may include a scale coupling device 706 that engages a complementary UAV coupling device 708 located on the UAV 704 at known locations.

In various embodiments, the scale components 702 of the configurable scale device 700 may be controlled by the central controller 114. For example, the ID module 118 may identify presence of the UAV 704 proximate to the configurable scale device 700. The central controller 114 may then cause individual ones of the scale components to move along the X axis and Y axis to locations such that the scale coupling devices 706 align with corresponding and complementary UAV coupling devices 708. The central controller 114 may then cause the scale components to engage the coupling devices 706 with the corresponding and complementary UAV coupling devices 708 by extending the scale components along the Z axis, and thus raising the UAV at least slightly. At this point, the weight of the UAV 704 is distributed across the scale components, which are each at known locations in the X, Y, and Z directions. The data may be transmitted to the central controller 114 for further processing.

The data collected by the configurable scale device 700 may be processed by the weight module 120, the CM module 122, or both as discussed above. In some embodiments, multiple scale components may be moveably positioned over a surface. A UAV may be placed on the surface, lifted and measured by the configurable scale device 700, and then returned to the surface. In some embodiments, the configurable scale device 700 may operate under a malleable surface, such as a surface having a very light and thin profile, such as a cloth surface, which may only nominally interfere with raising and weighing the UAV.

The scale components may move to determined locations (e.g., X and Y coordinates) based on analysis of imagery that identifies a location of the UAV or a portion of the UAV relative to the configurable device 700. For example, one or more cameras may be included under the surface that the scale components move about and/or may be included in or with the scale components. In some embodiments, the scale components may be moved to a location where the UAV is expected to be delivered to, such as by a conveyer or other transport that delivers the UAV.

Figure 7B:
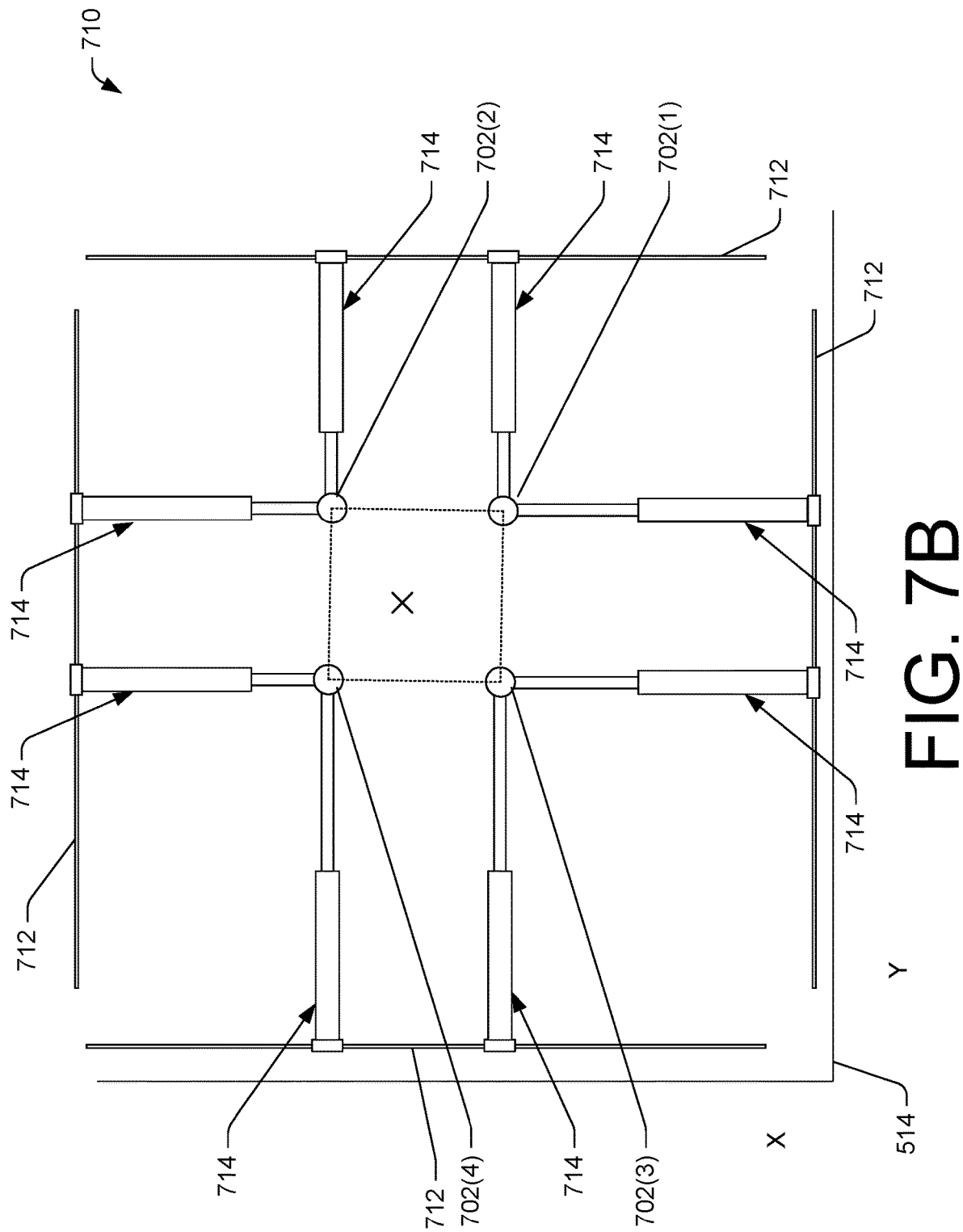

FIG. 7B is a schematic view of positioning mechanisms 710 that position components of the configurable scale device 700 (shown in FIG. 7A) for a UAV. The positioning mechanisms may move along rails 712, which may position movable arms 714 in different areas along a grid 716, defined here using the Cartesian coordinate system 514. The movable arms 714 may include telescoping features to enable the arms to extend and contract. However, other mechanical features may be used to enable the arms to change length. The arms 714 may position the scale components 702.

FIG. 8 is a flow diagram of an illustrative process 800 to measure a weight distribution of a UAV using the configurable scale device 700 and perform other analytics using the weight distribution. The process 400 is described with reference to the environment 100, the computer architecture 200, and the configurable scales 700.

At 802, the ID module 118 may determine that a UAV is located proximate to the configurable scale device 700. For example, an image system or a radio system may receive signals that indicate presence of the UAV.

At 804, the ID module 118 may position the scale components proximate to the UAV coupling points, such as based on a known location of the UAV relative to the configurable scale device 700 or detection of the UAV coupling points via imaging data, radio data, or other data. For example, the UAV coupling devices 708 may be detected by the scale components, such as by imagery captured by the scale components (e.g., colored markers, patterns, etc.).

At 806, the ID module 118 may cause the scale components to engage, via the scale coupling devices 706, the UAV coupling devices 708 and lift the UAV. The ID module 118 may cause the scale components to extend in the Z direction to lift the UAV.

At 808, the weight module 120 may receive signals from the various scale components. For example, each scale component may transmit a signal to the central controller 114.

At 810, the weight module 120 may convert the signals from the operation 808 into weights and determine a total weight associated with the UAV. For example, the weight module 120 may convert the signals into weights and then sum the weights to create a total weight associated with the UAV.

At 812, the CM module 122 may calculate a center of mass based on the weights or signals of the scale components engaging the UAV and location information associated with those scale components. In some embodiments, the center of mass may be expressed in two dimensions. However, when the UAV includes signal measurements in different orientations, the CM module 122 may determine the center of mass in three dimensions.

Figure 9A:
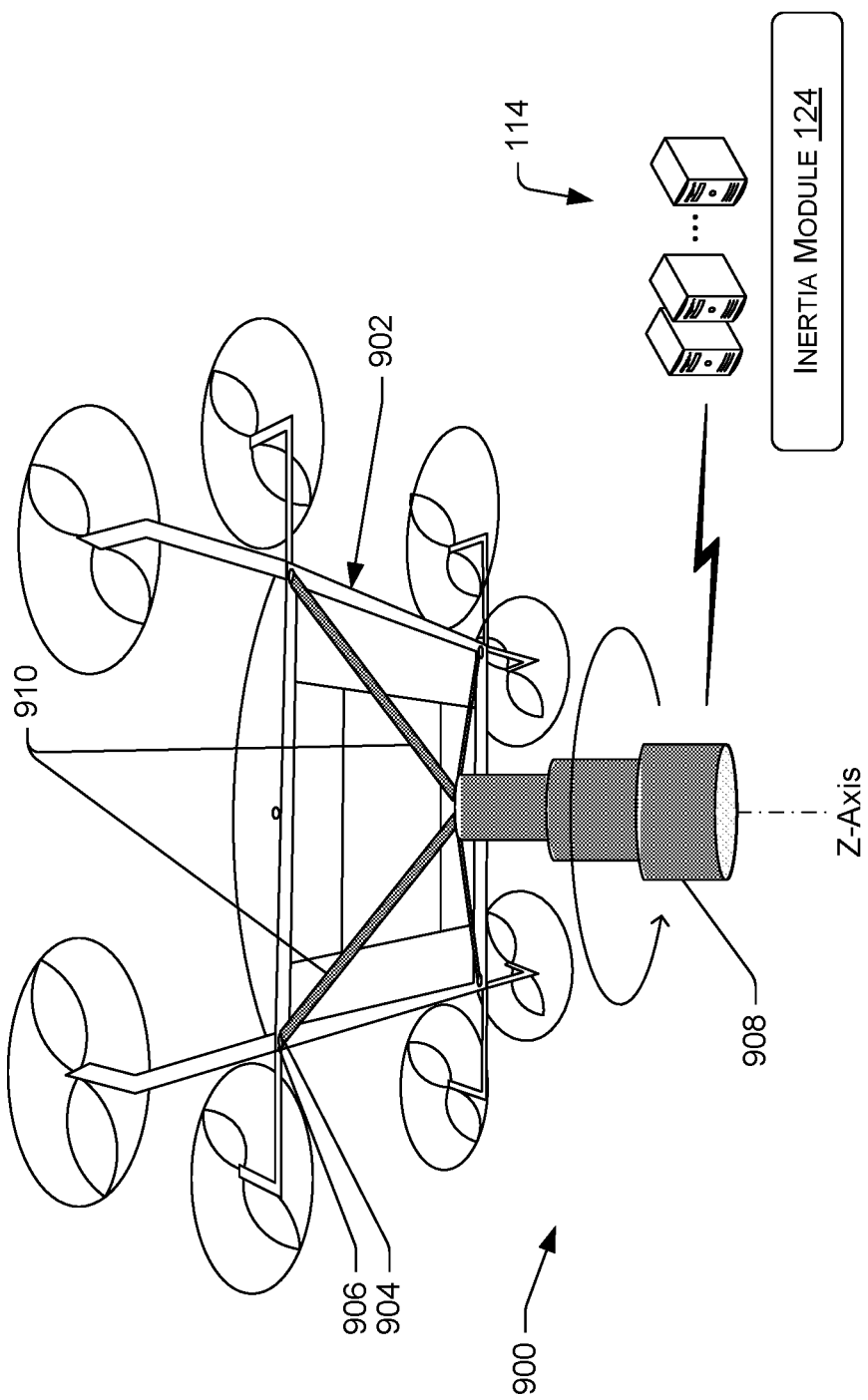
FIGS. 9A and 9B show illustrative inertia devices to measure moments of inertia of a UAV, among other possible uses.

FIG. 9A is an isometric view of a UAV on an illustrative inertia device 900 configured to measure a moment of inertia for yaw. The inertial device 900 may be configured to measure a moment of inertia of a UAV 902 associated with yaw. The inertial device 900 may include inertia coupling features 904 that engage corresponding and complementary UAV coupling devices 906, which may be the same or similar as the UAV coupling features 708 discussed with reference to FIG. 7, or engage other parts of the UAV. The inertia device 900 may be controlled at least partly by the central controller 114. The inertia device 900 may be positioned proximate to the UAV 902, may couple to the UAV, and then lift the UAV off a surface. In some embodiments, the inertia device 900 may determine locations of the UAV associated with the CM (e.g., calculated via the operation 406), which may be engaged by the coupling features 904. The inertia device 700 may include a telescoping body 908 that can extend and contract to lift the UAV. The inertia device 700 may include arms 910 coupled to an end of the telescoping body 908 that may be adjustable to cause the inertia coupling features 904 to engage corresponding and complementary UAV coupling devices 906.

To measure inertia, the inertia device 900 may rotate the UAV about a Z-axis, which may be perpendicular to the ground, and thus cause yaw rotation of the UAV. The inertial device 900 may be equipped with one or more accelerometers and/or other measuring instruments that may determine attributes of rotations of the UAV, such as an angular acceleration of the UAV caused by a given input force that rotates the UAV, via the inertia device. Thus, the inertia device may cause the UAV to rotate and may measure forces, time, revolutions, and/or other attributes associated with the rotation of the UAV.

At a conclusion of the test, the inertia device 900 may stop rotation of the UAV and then disengage from the UAV. The UAV may then be tested using other PMA devices and/or may be moved to a different location, possibly by air travel. The inertia device 900 may provide data to the central command 114, which may be used by the inertia module 124 to determine the moment of inertia associated with yaw.

Figure 9B:
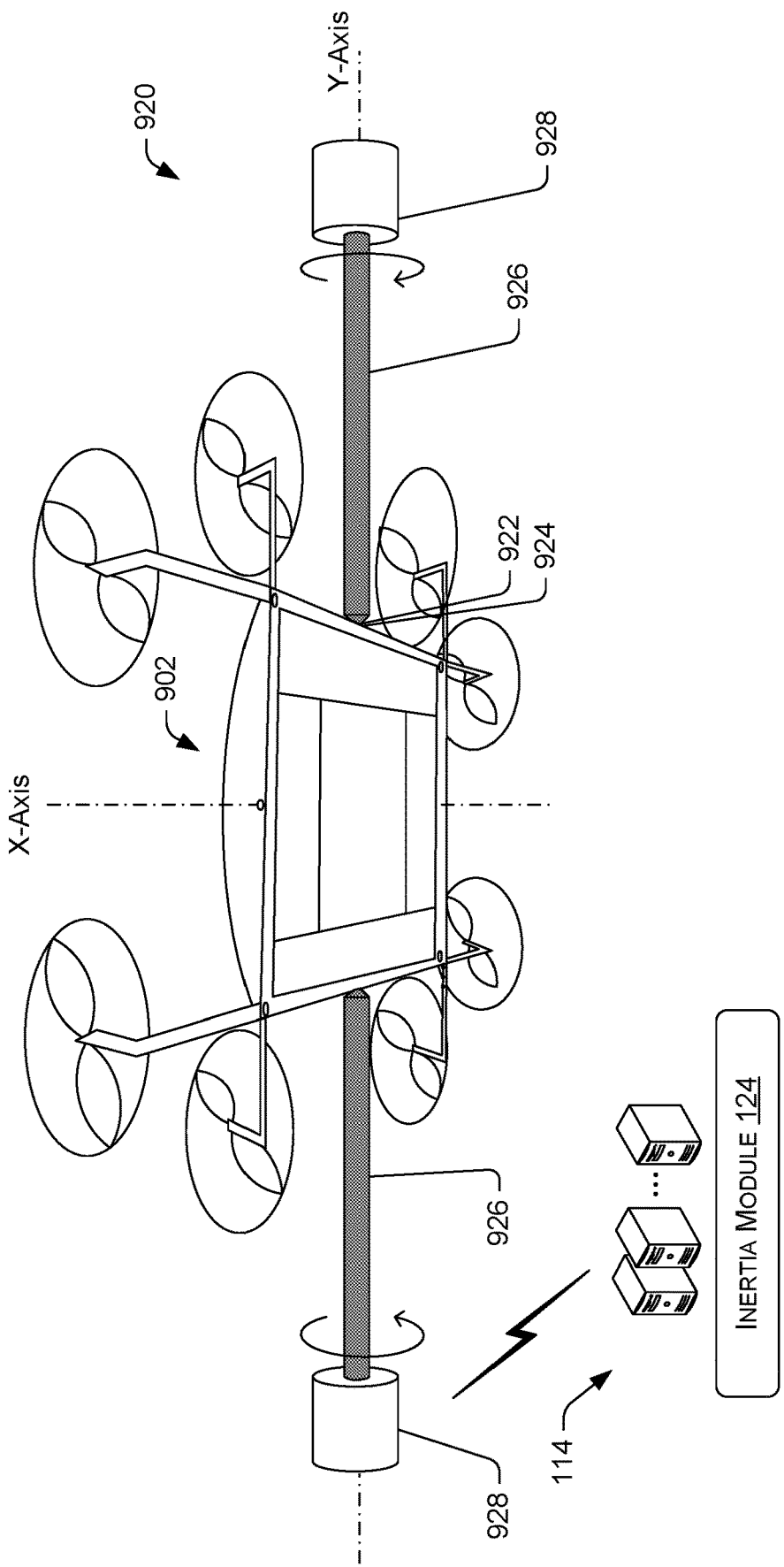

FIG. 9B is an isometric view of the UAV 902 on another inertia device 920 configured to measure a moment of inertia for roll and/or pitch. The inertia device 920 may include inertia coupling devices 922 that couple to UAV coupling device 924, which may be the same or similar to the UAV coupling devices 906 and 708 as discussed above. The inertial device 920 may include arms 926 coupled to one or more motors 928, which may cause rotation of the arms 926. The arms 926 may extend and/or contract to cause the inertia coupling devices 922 to engage and couple to the UAV coupling device 924.

To measure inertia, the inertia device 920 may rotate the UAV about a Y-axis (as shown) or an X axis, which may be associated with pitch or roll of the UAV 902. The inertial device 900 may be equipped with one or more accelerometers and/or other measuring instruments that may determine attributes of rotations of the UAV 902, such as an angular acceleration of the UAV 902 caused by a given input force that rotates the UAV 902, via the inertia device 920. Thus, the inertia device 920 may cause the UAV 902 to rotate and may measure forces, time, and/or other attributes associated with the rotation of the UAV 902.

At a conclusion of the test, the inertia device 920 may stop rotation of the UAV and then disengage from the UAV 902. The UAV 902 may then be tested by rotating about another axis, such as the X-axis, using other PMA devices, and/or may be moved to a different location, possibly by air travel. The inertia device 920 may provide data to the central command 114, which may be used by the inertia module 124 to determine the moment of inertia associated with pitch and/or roll.

The load cell grid, configurable scale device, the inertia devices discussed above are all examples of the PMA devices used to measure attributes of the UAVs. In some embodiments, the central controller 114 may interact with multiple different PMAs, which may be of different types, to obtain physical metrics from one or more UAVs.

Figure 10A:
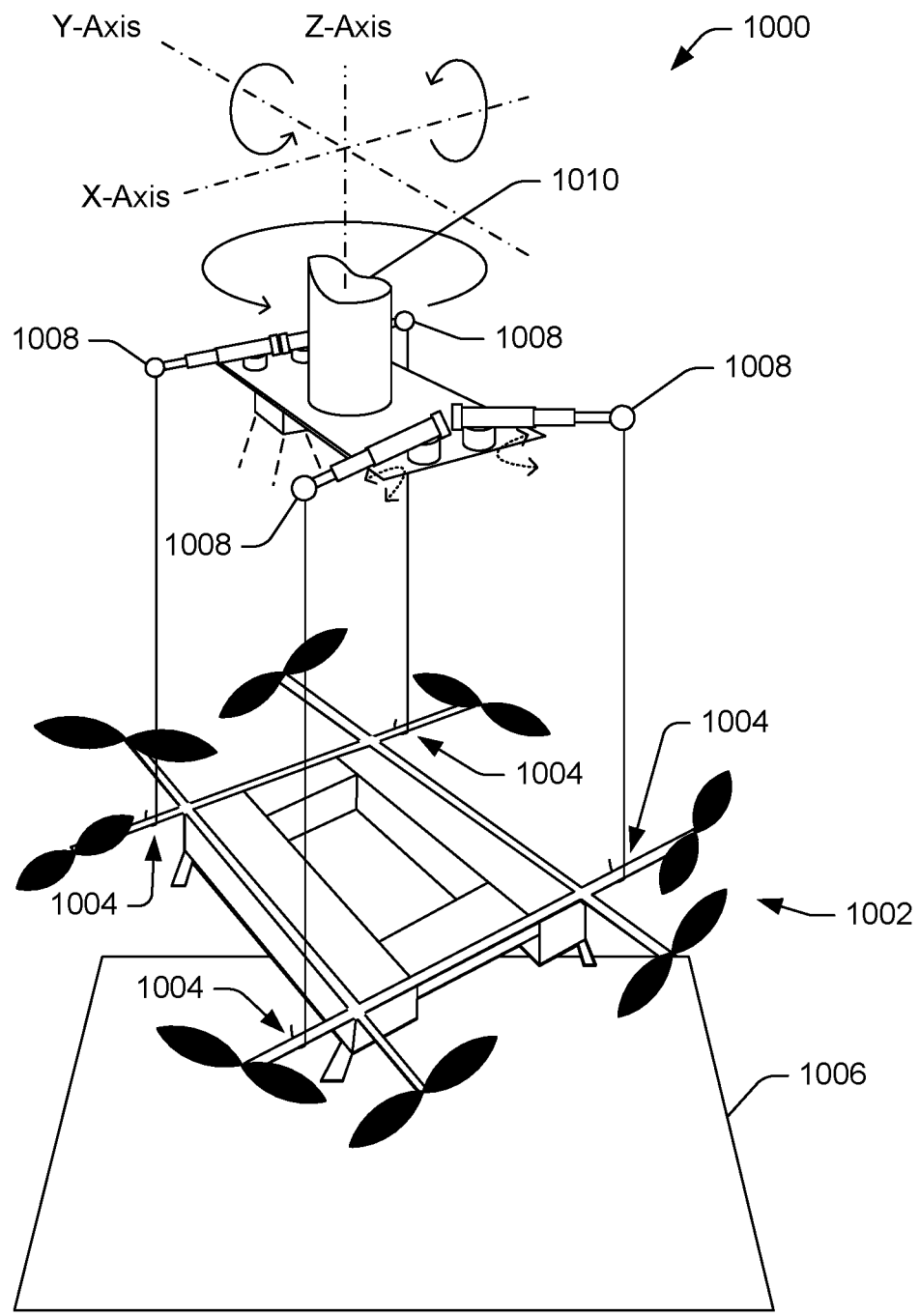
FIGS. 10A and 10B show an illustrative hanging configurable scale, which may be used to determine total weight, center of mass, and/or moments of inertia for a UAV.

FIG. 10A shows a hanging configurable scale 1000 coupled to a UAV 1002. The hanging configurable scale 1000 may be used to determine total weight, center of mass, and/or moments of inertia for the UAV 1002. The hanging configurable scale 1000 may couple to the UAV 1002 at various locations 1004 of the UAV and then lift the UAV off of a surface 1006 to cause the UAV to be suspended in air such that the hanging configurable scale 1000 is loaded with the full weight of the UAV 1002. While the UAV is suspended by the hanging configurable scale 1000, scale components 1008 of the hanging configurable scale may measure a weight at corresponding different coupling locations associated with a location where the hanging configurable scale 1000 couples to the UAV. As discussed above, this information may be used to determine a total weight and a CM for the UAV 1002. In some embodiments, the hanging configurable scale 1000 may rotated via a support 1010, which may enable measurement of moments of inertia about an X-axis, a Y-axis, and/or a Z-axis, possibly using similar techniques as discussed above. For example, a controllable arm may be coupled to the support to lift the UAV 1002 to determine the weights and/or move or swing the UAV about one or more of the axes to measure the one or more moment of inertia.

Figure 10B:
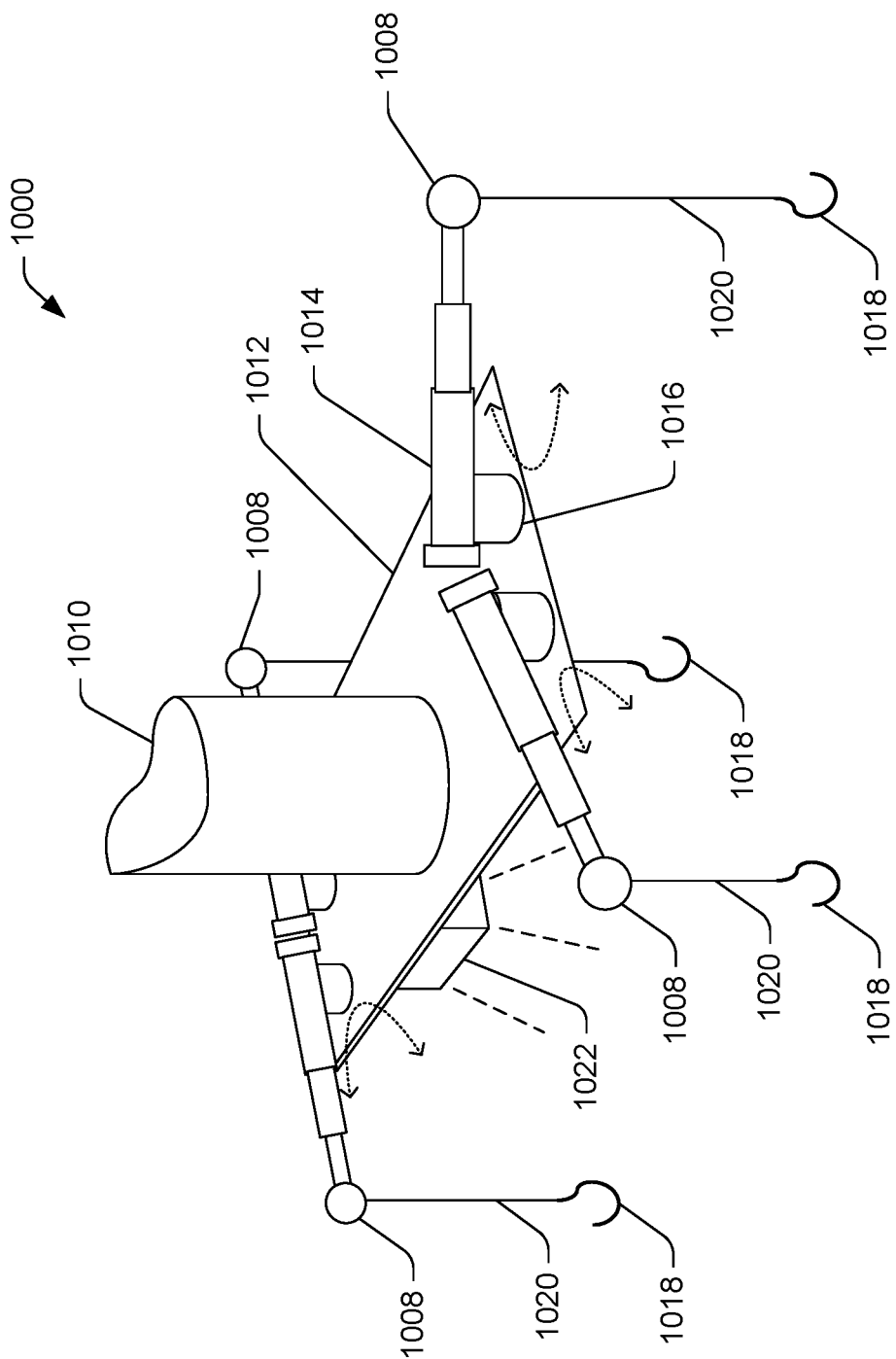

Turning to FIG. 10B, the hanging configurable scale 1000 is described in further detail. The hanging configurable scale 1000 may include a frame 1012 coupled to the support 1010. The frame 1012 may support arms 1014, which may be moveable about one or more degrees of freedom. The movement may enable the hanging configurable scale 700 couple to UAVs having different sizes and shapes, including winged UAVs and rotor-craft UAVs. In some embodiments, the arms may extend, contract, and swivel to enable location of the scale components 1008 throughout a predefined area. The each of the arms 1014 may be coupled to a rotation device 1016, which may enable the corresponding arm to rotate about an axis that is perpendicular to a plane defined by the frame. The arms 1014 may include telescoping segments, which may be extended and contracted by servos and/or other devices. Movement of the scale components 1008 via the arms may enable positioning couplers 1018 at specific locations to engage and couple to a structure of many types of UAVs, such as the UAV 1002 shown in FIG. 10A.

The scale components 1008 may be configured to measure a weight applied to a tension member or line 1020 associated with each of the scale components. As used herein, tension member 1020 may be a string, rope, wire, cord, or any other device capable of supporting loads in tension. The line 1020 may couple to one of the couplers 1018, which couple to a structure of a UAV. The line 1020 may be extended and/or contracted, such as by rotating a spool included in or proximate to a respective on of the scale components 1008. By manipulating the length of the line 1020, the hanging configurable scale 1000 may engage a UAV and cause the UAV to be suspended, which may enable measurement by the scale components of weights associated with the UAV. By manipulating the arms 1014, the couplers 1018 may be moved to couple to known locations of the UAV. An imaging device 1022 may capture imagery of the UAV and positions of the couplers 1018. The imagery may be used to position the couplers 1018 (via the line 1020 and/or the arms 1014) and/or determine where the couplers 1018 couple to the UAV, which may then be used in determining the CM. The imaging device 1022 may be used to identify a type of the UAV and/or a specific one of many UAVs, such as using optical recognition, reading optical codes, and/or deploying other sensing algorithms to determine location of the couplers 1018 with respect to the UAV. The line 1020 may include a cable, string, cord, or any other load bearing material. The coupler 1018 may be a hook, a mechanical pinching mechanism, a magnet, and/or any other device that may couple to the UAV to enable suspending the UAV. In some embodiments, the coupler 1018 may engage a complementary UAV coupler such that the location of the coupling is known for a specific UAV. The coupler 1018 may be a generic shape or device, such as a hook-shaped or U-shaped device, a clamping or actuated device, or a magnetic device.

Figure 11:
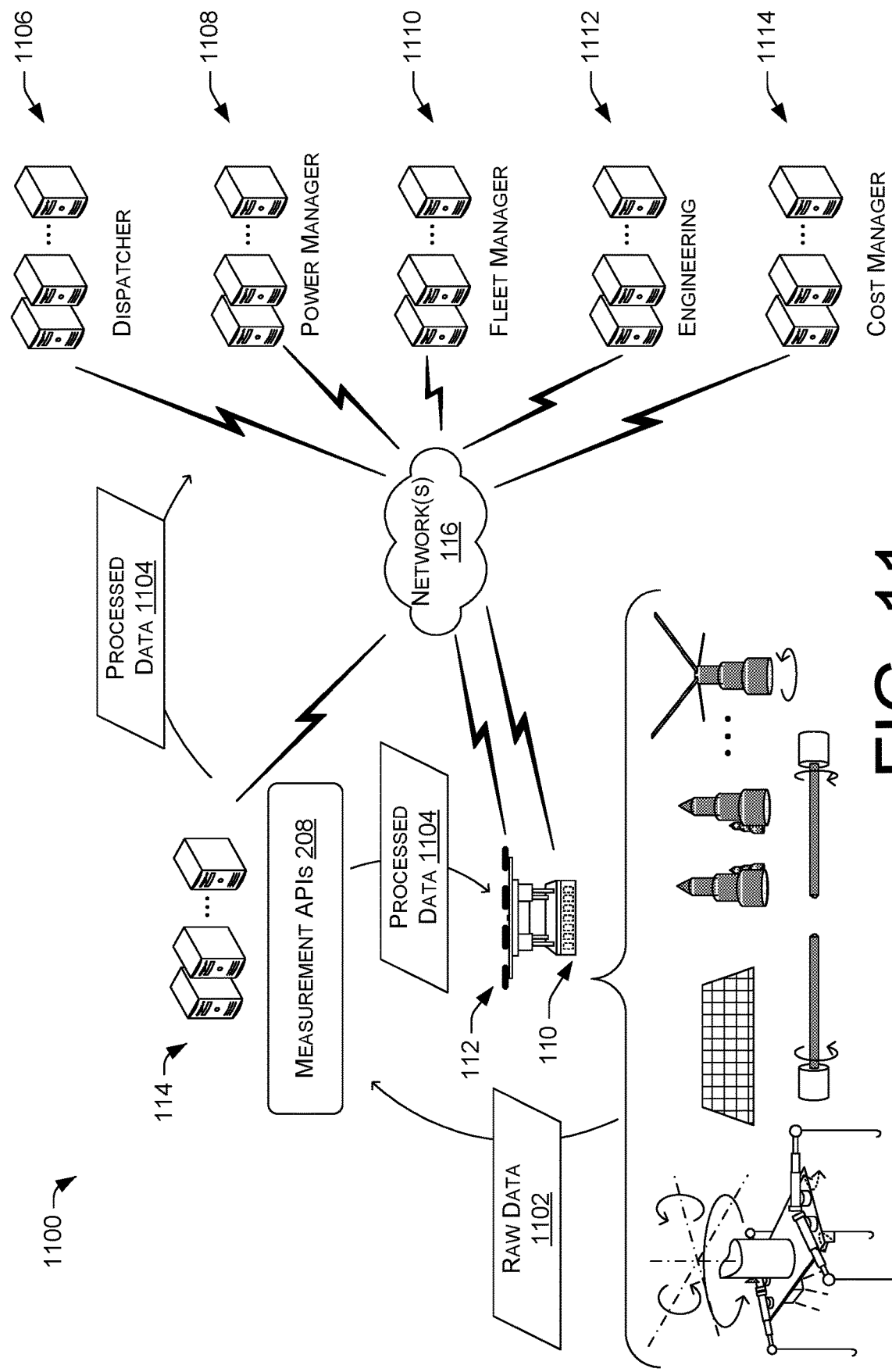
FIG. 11 is a schematic diagram that shows illustrative connectivity between various illustrative APIs used to communicate data from the PMA device(s) to the central controller, and for distribution to the UAV and/or other devices and/or systems.

FIG. 11 is a schematic diagram that shows illustrative connectivity 1100 between various illustrative APIs used to communicate data from the PMA device(s) to the central controller, and for distribution to the UAV and/or other devices and/or systems. As discussed above, the central controller 114 may include measurement APIs 208, which may include routines, protocols, data types, and tools for creating and exchanging information between different devices and systems. As shown in FIG. 11, the central controller 114 may communicate with the PMA device(s) 110, the UAV 112, and possibly many other systems. To facilitate such communications and distribution of raw data 1102 (signal data, identification data, location data, etc.) as well as processed data 1104 (e.g., calculated weight, center of mass, moments of inertia, etc.), the measurement APIs may provide mechanisms to create, read, and distribute this information.

As shown in FIG. 11, the central controller 114 may distribute the processed data 1104 to one or more systems. The systems may include a dispatcher 1106, a power manager 1108, a fleet manager 1110, engineering 1112 (research and development), and a cost manager 1114 (or business unit). The dispatcher 1106 may dispatch the UAV for a flight task, such as by creating a task, selecting a UAV for the task, and so forth. The dispatcher 1106 may use the processes data 1104 to determine whether a UAV is suitable for a flight task. The power manager 1108 may provide power resources to the UAV, such as by charging a battery of the UAV, selecting a battery for the UAV, providing fuel to the UAV, and/or providing other power resources. The power manager 1108 may receive the processed data 1104, possibly along with information from the dispatcher 1106 that indicates a flight task, which may then be used by the power manager 1108 to determine the power resources for the UAV. The fleet manager 1110 may perform maintenance and/or detailed inspections of the UAV at different times which may be scheduled or in response to indicators, such as the processed data 1104. For example, if the center of mass of the UAV is outside of a threshold zone, then the UAV may be routed by the fleet manager 1110 for a detailed inspection, maintenance, or other operations. The engineering 1112 may use the process data for future designs, modification, research, or for other similar reasons. The cost manager 1104 may use the processed data 1104 for business purposes, such as for billing, determining shipping costs, and/or for other business purposes.

The central command 114 may transmit some of the processed data 1104 to the UAV, which may use the processed data to update a control system of the UAV. For example, the UAV 112 may update the stability controller 314 based on weight data and center of mass data for the UAV that is obtained by one of the PMA devices 110. The UAV 112 may update the stability controller 314 based on moment of inertia data for the UAV that is obtained by one of the PMA devices 110

The measurement APIs 208 may create streamlined data transmission protocols and data formats to enable the various devices, systems, and components to communicate and share the raw data 1102 and/or the processed data 1104 as discussed above.

In accordance with one or more embodiments, the APIs may include the following components, which may be data structures and/or routines. A first component may be configured to receive signals associated with weight and location information associated with the UAV. A second component may be configured to convert each signal into a weight associated with a location. A third component may be configured to store total weight of the UAV and a center of mass associated with the UAV, the total weight and center of mass being derived from each weight associated with each location. A fourth component may be configured to transmit the total weight of the UAV and the center of mass of the UAV to at least one other system or device.

The APIs may establish modes of communication between the various devices and systems, and initiate and terminate those communications. For example, the APIs may determine presence of a UAV proximate to a PMA device, which may then initiate operation of the PMA device, data acquisition, and so forth as discussed above. The communications may be based on the communicating entities (devices, systems, etc.), and may be selected from many types of communications, including optical communications (including imagery), radio communications, electrical signal communications (e.g., weighing of a UAV with load cells, etc.), and/or other communications.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system to determine a weight associated with an unmanned aerial vehicle (UAV), the system comprising:
   a network interface;
   one or more processors coupled to the network interface; and
   memory to store computer-executable instructions executable by the one or more processors, wherein the instructions, when executed, cause the one or more processors to perform operations comprising:
      configuring a plurality of scale component devices to weigh the UAV;
      receiving data associated with individual scale component devices of the plurality of scale component devices that weighs the UAV, the data including at least a first signal that is associated with a weight;
      associating the first signal with the UAV;
      based at least in part on the first signal, calculating a total weight of the UAV;
      causing the network interface to transmit the total weight of the UAV to at least one of the UAV or a different system that interfaces with the UAV; and
      receiving, from the at least one of the UAV or the different system, based at least in part on the total weight of the UAV, a second signal used to identify a type of the UAV.

2. The system of claim 1, wherein the network interface comprises at least one of a transceiver, a radio frequency identifier receiver, or an imaging device;
   wherein receiving the second signal further comprises receiving, via the network interface, the second signal from the UAV,
   wherein the instructions, when executed, further cause the one or more processors to perform operations comprising:
      based at least in part on the second signal, identifying the type of the UAV.

3. The system of claim 1, wherein the instructions, when executed, further cause the one or more processors to perform operations comprising:
   based at least in part on the total weight and an assigned flight task, selecting a power source.

4. The system of claim 1, wherein the network interface is a wireless network interface.

5. A method comprising:
   configuring a plurality of scale component devices to weigh an unmanned aerial vehicle (UAV);
   receiving data associated with individual scale component devices of the plurality of scale component devices that weighs the UAV, the data including at least a first signal that is associated with a weight;

associating the first signal with the UAV;
based at least in part on the first signal, calculating weight data;
transmitting, via a network interface, the weight data to at least one other device; and
receiving, via the network interface and from the at least one other device, based at least in part on the weight data, a second signal used to identify a type of the UAV.

6. The method of claim 5, wherein receiving the second signal further comprises receiving, via the network interface, the second signal from the UAV, the method further comprising:
based at least in part on the second signal, identifying the type of UAV.

7. The method of claim 6, wherein the network interface comprises at least one of a transceiver, a radio frequency identifier receiver, or an imaging device.

8. The method of claim 5, further comprising:
based at least in part on the weight data, determining a power requirement for a flight task; and
based at least in part on the power requirement, configuring the UAV for the flight task.

9. The method of claim 5, further comprising:
based at least in part on the weight data, identifying the type of the UAV.

10. The method of claim 9, further comprising:
based at least in part on identifying the type of the UAV, comparing the weight data to an expected weight; and
determining a power requirement for a flight task.

11. The method of claim 5, further comprising:
based at least in part on the weight data, adjusting flight parameters of the UAV to improve at least one of flight stability or power efficiency.

12. The method of claim 5, wherein the network interface is a wireless network interface.

13. A non-transitory computer-readable medium storing instructions that, when executed, cause one or more processors to perform operations comprising:
configuring a plurality of scale component devices to weigh a vehicle;
receiving data associated with individual scale component devices of the plurality of scale component devices that weighs the vehicle, the data including at least a first signal that is associated with a weight;
calculating a total weight based at least in part on the first signal;
transmitting, via a network interface, the total weight to at least one other device; and
receiving, via the network interface and from the at least one other device, based at least in part on the total weight, a second signal used to identify a type of the vehicle.

14. The non-transitory computer-readable medium of claim 13, wherein receiving the second signal further comprises receiving, via the network interface, the second signal from the vehicle, the operations further comprising:
based at least in part on the second signal, identifying the type of the vehicle.

15. The non-transitory computer-readable medium of claim 14, wherein the network interface comprises at least one of a transceiver, a radio frequency identifier receiver, or an imaging device.

16. The non-transitory computer-readable medium of claim 13, the operations further comprising:
based at least in part on the total weight, determining a power requirement for a flight task; and
based at least in part on the power requirement, configuring the vehicle for the flight task.

17. The non-transitory computer-readable medium of claim 13, the operations further comprising:
based at least in part on the total weight, identifying the type of the vehicle.

18. The non-transitory computer-readable medium of claim 17, the operations further comprising:
based at least in part on identifying the type of the vehicle, comparing the total weight to an expected weight; and
determining a power requirement for a flight task.

19. The non-transitory computer-readable medium of claim 13, the operations further comprising:
based at least in part on the total weight, adjusting flight parameters of the vehicle to improve at least one of flight stability or power efficiency.

20. The non-transitory computer-readable medium of claim 13, wherein the network interface is a wireless network interface.

* * * * *